United States Patent Office 2,717,986
Patented Sept. 13, 1955

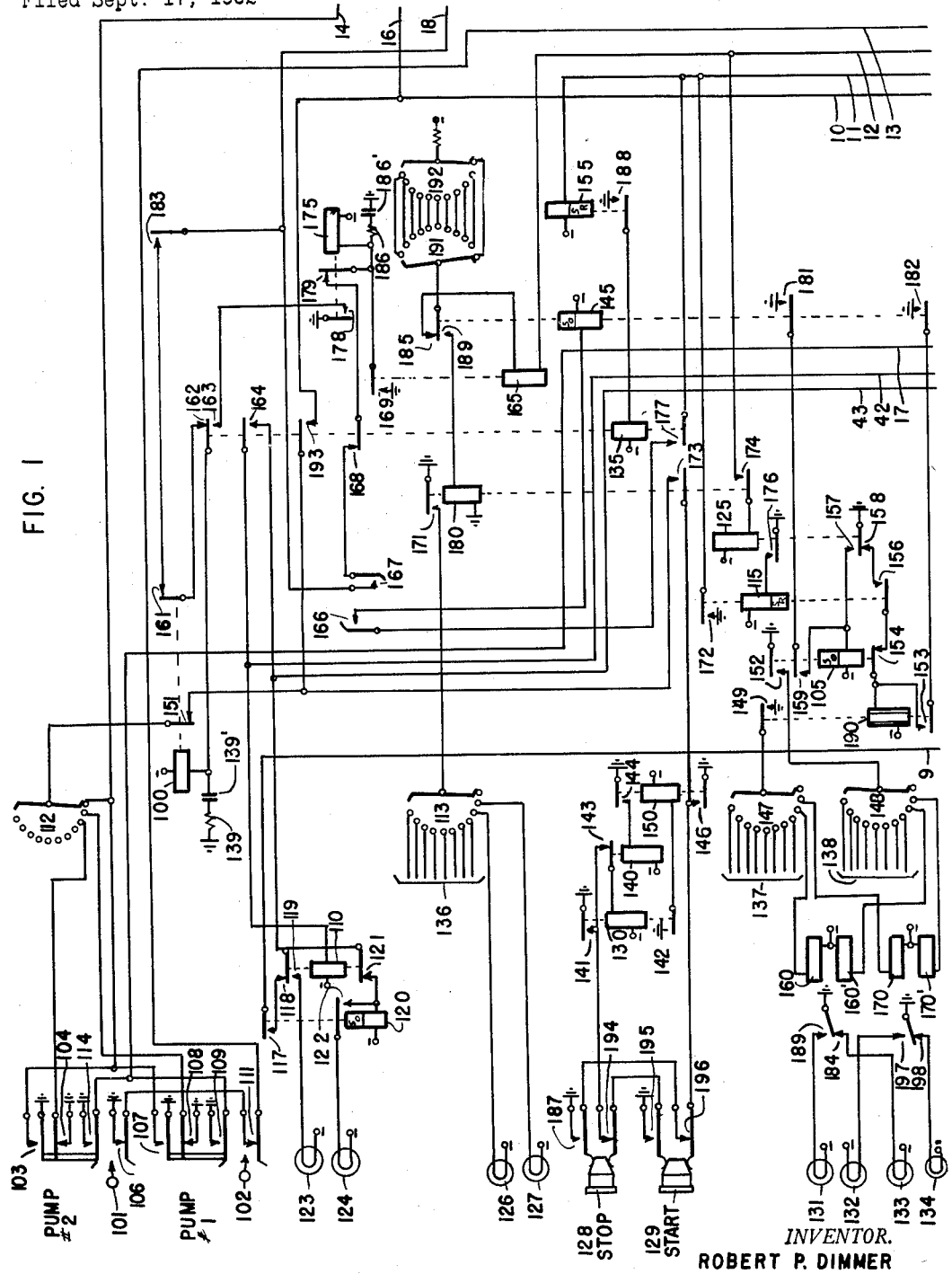

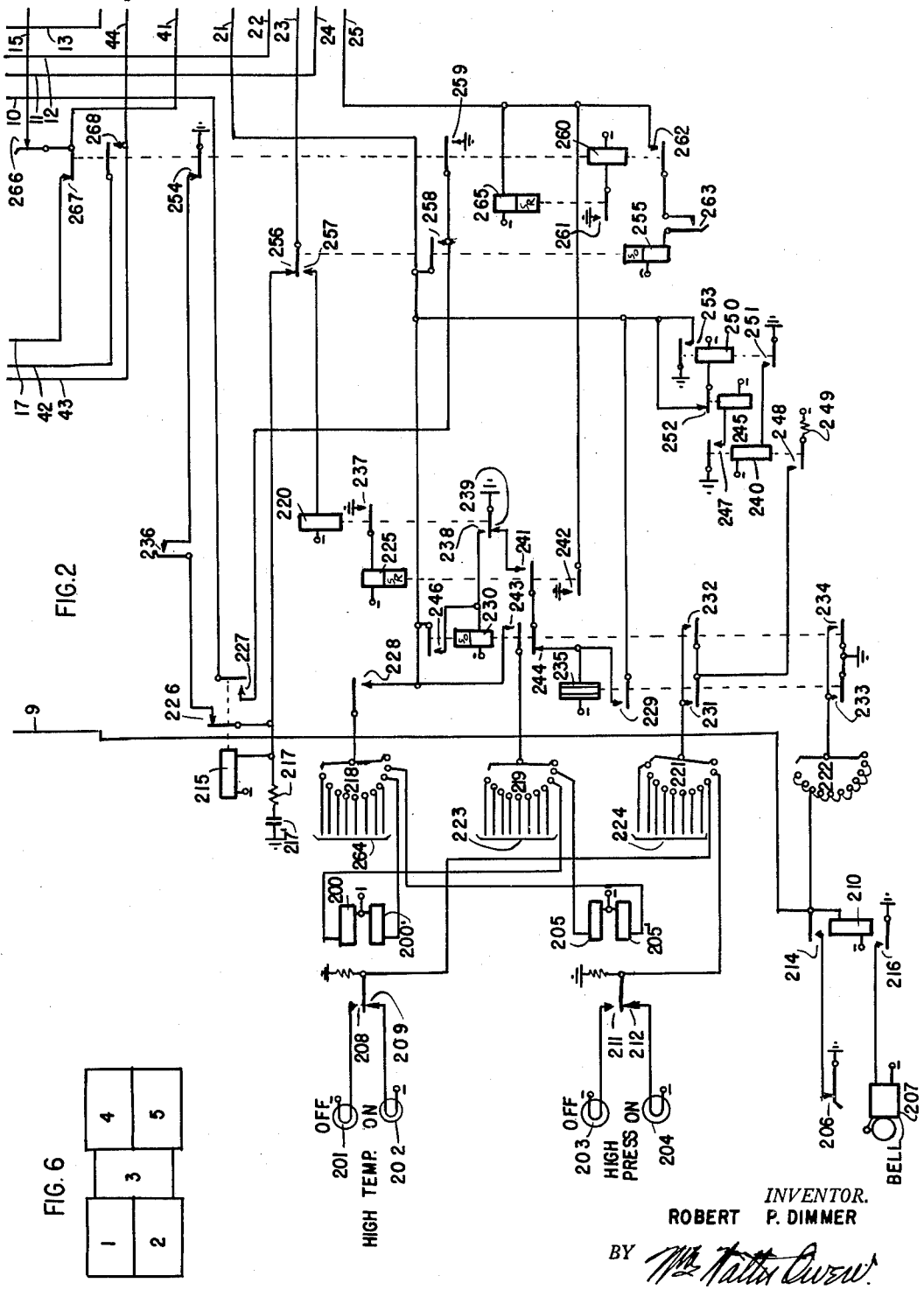

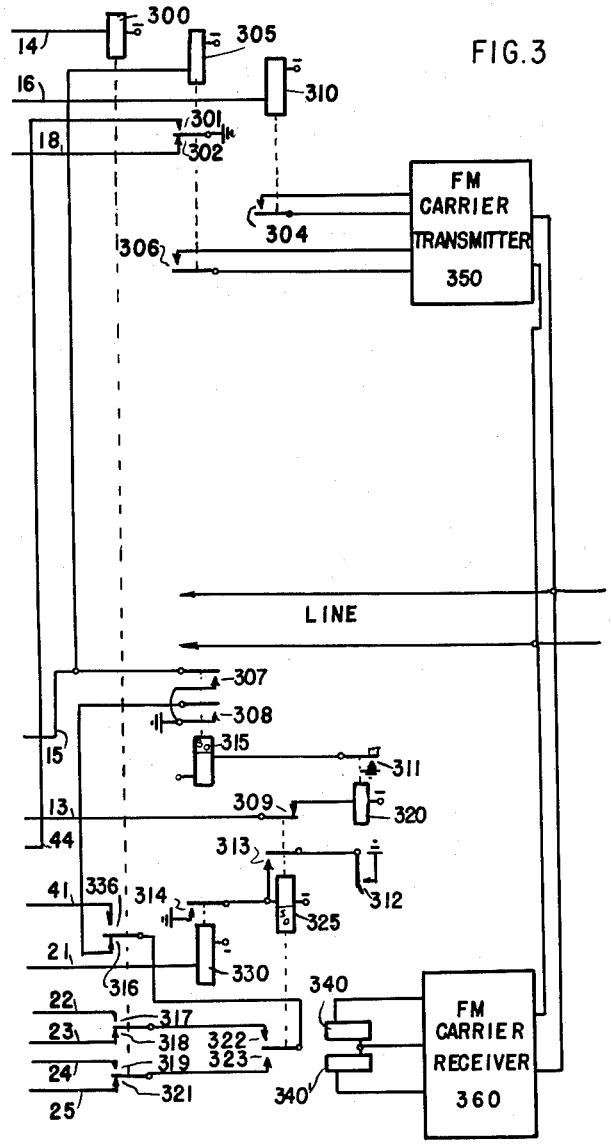
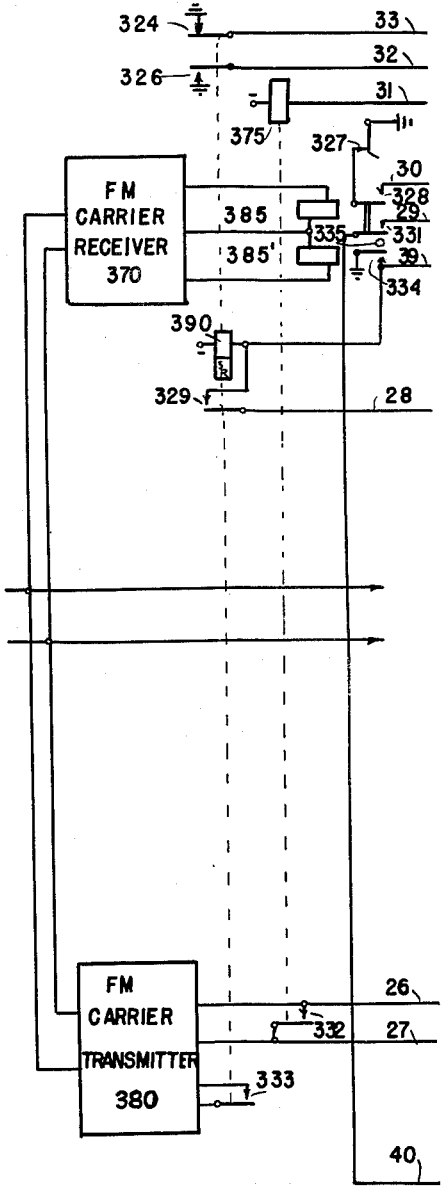

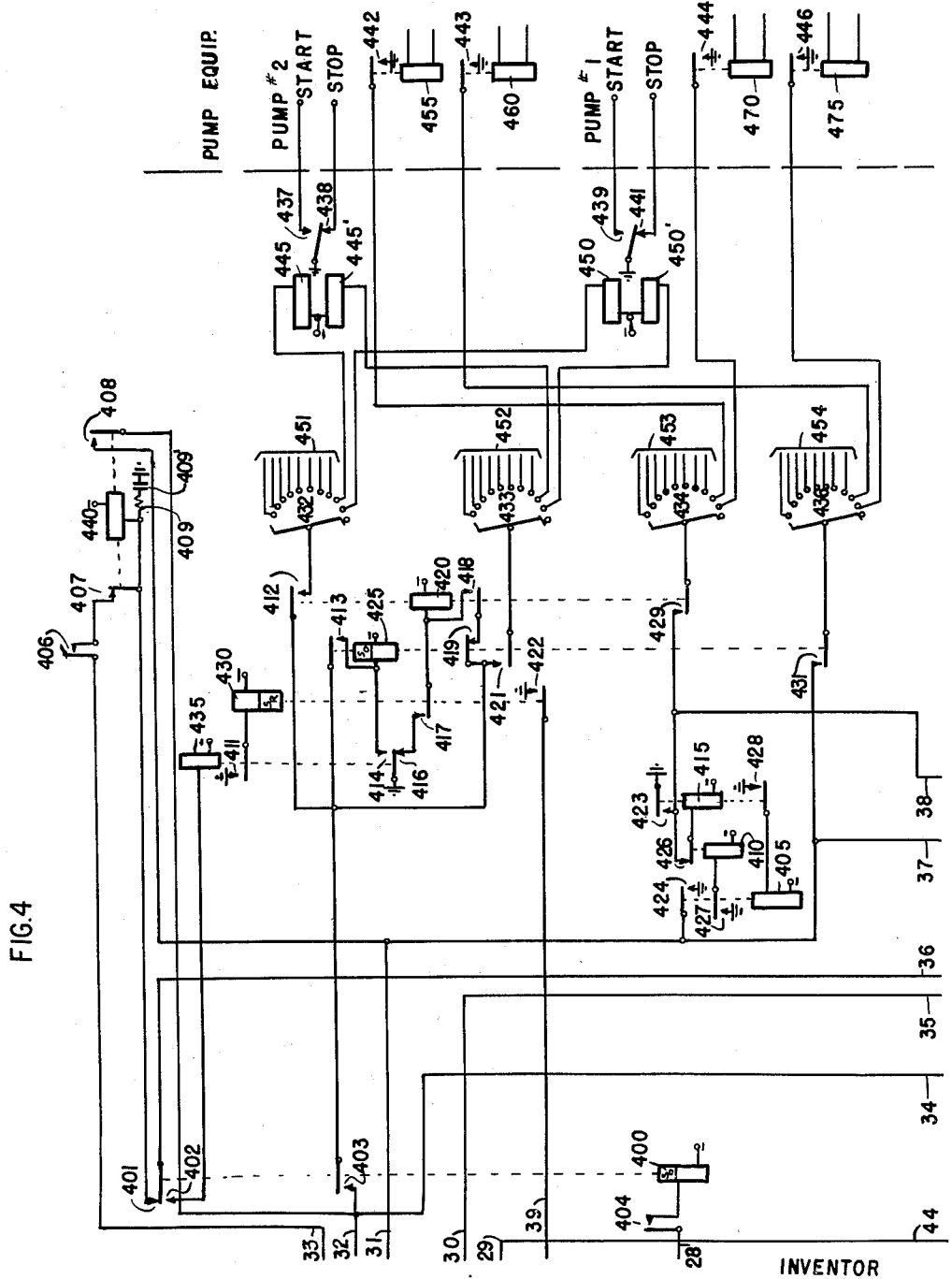

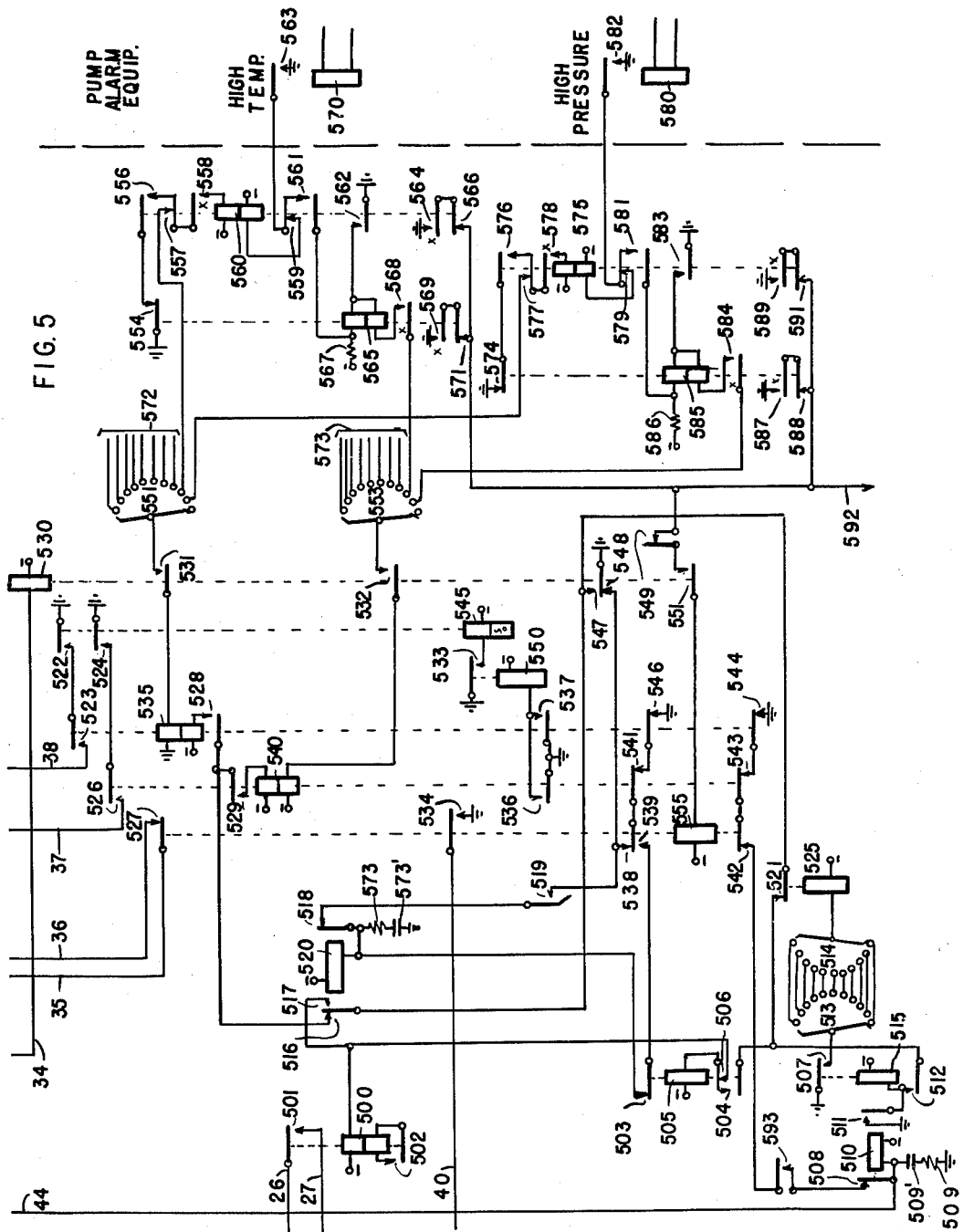

2,717,986

REMOTE CONTROL SYSTEMS

Robert P. Dimmer, Lombard, Ill., assignor to Automatic Electric Laboratories, Inc., Chicago, Ill., a corporation of Delaware Application September 17, 1952, Serial No. 310,029

10 Claims. (Cl. 340—163)

This invention relates generally to remote control systems, and more specifically to an improved type of remote control system having means by which an operator at a control station can control the operation of equipment at a substation and receive a visual indication in return that the equipment did function as intended. This invention also relates specifically to means for automatically indicating, visually and audibly, at the control station, the occurrence of trouble at the substation.

An object of this invention is to provide a remote control system in which an operator at a control station can transmit a preliminary signal to a substation and receive in return a signal indicating that the substation is in readiness for operation.

A further object of this invention is to provide a system wherein a number of functions at a substation can be controlled from a control station only after the control station has received a signal that the substation is in readiness for operation, after which the operator at the control station can control certain functions at the substation and will receive in return a visual indication that the equipment at the substation functioned as intended.

A further object of this invention is to provide a checking circuit in a remote control system which will prevent the operation of any equipment at the substation due to false signals induced into the line or carrier channel between the stations.

Another object of this invention is to provide an automatic alarm system for a remote control system wherein the malfunctioning of any equipment at the remote station will cause a signal to be automatically transmitted to the control station to energize an audible and a visual alarm at the control station.

A further object of this invention is to provide, in a remote control system having an automatic alarm system, check circuits wherein a false alarm will not be transmitted to the control station.

This specific embodiment features frequency modulated carrier wave transmitters and receivers to convey the control and alarm signals between the control station and the substation. The outputs and inputs of these transmitters and receivers are respectively, in this embodiment, connected to a conventional telephone line disposed between the control station and the substation. However these inputs and outputs could be connected to microwave antenna systems for transmission between the stations.

Another feature of this invention is the use of standard telephone type rotary switches for establishing control and check circuits in the system.

A further feature of this invention is the large number of separate and distinct operations that can be remotely controlled and the large number of alarms which can be automatically transmitted from the remote station to the control station.

Further objects and features of this invention will become apparent upon a perusal of the following specification in conjunction with the drawings of which Figure 1 shows a diagrammatic representation of part of the control equipment at the control station. Figure 2 shows a diagrammatic representation of part of the alarm equipment at the control station. Figure 3 shows a diagrammatic representation of part of the control equipment and alarm equipment at both the control station and the substation with the line connecting the stations. Figure 4 shows a diagrammatic representation of part of the control equipment at the substation. Figure 5 shows a diagrammatic representation of the automatic alarm equipment at the substation. Figure 6 shows, as an aid in understanding the figures, a method for assembling the various figures to form the complete system.

The present embodiment is the preferred embodiment but it is to be understood that changes can be made in the present embodiment by one skilled in the art without departing from the spirit and scope of this invention.

Generally, this embodiment shows two alarm functions and two control functions at the substation which may be started or stopped. This embodiment further shows, at the control station, two lamps for supervision of the line or connecting channel, and two lamps for indicating the readiness of the equipment at the substation for control by an operator at the control station, two control keys for controlling the control functions at the substation, two lamps to indicate the starting of the two control functions at the substation and two lamps to indicate the stopping of the two control functions at the substation. This embodiment further shows, at the control station, two lamps for indicating the operation of the two alarms at the substation, and two lamps for indicating the return to normal of the equipment at the substation which had caused an operation of the alarms, and an audible alarm for audibly indicating the operation of any one of the two alarms at the substation, and means for resetting the audible alarm to condition it for reoperation should the second alarm at the substation begin to operate before the first alarm returns to normal. It is to be understood and it will be shown below how the system may be expanded to include more control and alarm functions.

Generally, to control a remote function, which may be a switch, pump, valve or similar apparatus, the operator at the control station operates the circuit key for the particular equipment at the substation which is to be controlled. This causes ground to be removed from one of the bank contacts of a telephone type rotary switch at the control station which has all of its banks initially grounded, the ungrounded contact corresponding to the selected equipment. This well known telephone type rotary switch has any number of bank levels and any number of bank contacts per level. A motor magnet forming part of the switch controls the movement of a number of wipers, one for each level, successively over each bank contact. Also, the switch is so constructed that the wipers are moved to the successive contacts upon each deenergization of the motor magnet, rather than upon the energization of the motor magnet. The operation of the circuit key also causes a signal to be sent to the substation. The receipt at the substation of the signal causes the operating magnet of the rotary switch at the substation to be energized which in turn causes a return signal to be sent back to the control station. The return signal causes the operating magnets of both of the rotary switches at the control station to be energized which in turn causes the first signal to be discontinued. The discontinuation of the first signal causes the operating magnet of the substation rotary switch to deenergize and consequently steps one step. This in turn causes the return signal to be discontinued; consequently the operating magnets of the two rotary switches at the control station deenergize and step one step. This cycle of steps continues until the wiper of the control station rotary switch with the grounded bank contacts reaches the contact on which ground has been removed. If no signals are lost or gained in the synchronized operation of the three rotary switches they will reach the same contact point. When this is done a circuit for one of the lamps at the control station will be completed and the lamp will light to indicate that the circuit is in readiness for operation. If signals have been lost or gained the lamp will not be lit to indicate the circuit in readiness for operation, and the operator must then reoperate the circuit key for the particular equipment at the control station to again attempt to set up the particular control circuit. After the "circuit in readiness" lamp is lit the operator will operate the control key for the equipment to be controlled to cause pulses to be transmitted from the control station to operate the equipment. When the equipment begins to operate a signal is returned to the control station to cause one of the lamps to be illuminated to indicate that the particular equipment at the substation is operating. To stop the equipment which is operating at the substation, the operator operates the control key at the control station for stopping the equipment. This causes a signal to be sent to the substation to cause the equipment operating thereat to stop, and when the equipment thereat has stopped a signal is returned to the control station to indicate this condition by means of another lamp at the control station.

Generally, the alarm equipment operates with similar types of synchronizing circuits. The trouble must first cause the closing of a pair of contacts. This is not shown in this embodiment but it is to be understood that the trouble will cause the operation of a relay associated with the equipment having the trouble. The operation of the relay causes a rotary switch to start hunting which in turn causes a signal to be sent to the control station. This signal causes the energization of the operating magnet of a rotary switch at the control station, and the rotary switch at the control station in turn causes a return signal to be sent back to the substation. This return signal causes the operating magnet of another rotary switch at the substation to be energized. The operating magnet of the hunting rotary switch then deenergizes which causes it to step and also causes the first signal to be discontinued. The rotary switch at the control station therefore steps and causes the return signal to be discontinued which in turn causes the stepping of the other substation rotary switch. This cycle continues until the hunting rotary switch finds the bank contact associated with the malfunctioning equipment. If no signals are lost or gained in the synchronized operation of the three rotary switches, the rotary switches at the substation will reach the same contact point. When this is done a circuit will be completed for the transmission of a series of pulses to the control station which will in turn energize an alarm lamp as well as an audible alarm bell. If the trouble at the substation corrects itself, the same circuits will function in a similar manner to energize another alarm lamp to indicate the correction of the trouble. When a series of alarms are being received the alarm lamps will flash for a few moments and then will remain steadily illuminated. An audible alarm reset key is provided at the control station by means of which the operator can stop the audible alarm bell. As mentioned above the trouble which occurs must cause the closing of a pair of switch contacts. The troubles for which alarms can be provided can be abnormally high or low pressures or temperatures in the equipment at the substation. If the power fails at the substation, or if the telephone lines between the two stations should break, a line supervisory alarm lamp at the control station will light and the audible alarm will operate.

To describe the apparatus of the invention in detail reference is first made to Fig. 1, wherein part of the apparatus at the control station for controlling functions at the substation is shown. The keys 101 and 102 are the circuit keys for selecting the equipment at the substation which is to be controlled. Assuming for purposes of simplicity of explanation that two pumps at the substation are to be controlled, the operation of circuit key 101 will cause a closing of contacts 103, 114 and opening of contacts 104 and 106 to cause the equipment to begin to operate to establish a control circuit for the second pump. The operation of circuit key 102 will cause the closing of contacts 107 and 109 and the opening of contacts 108 and 111 to cause the equipment to begin operating to establish a circuit for the control of the first pump. The lamps 126 and 127 are the "circuit in readiness" lamps and these lamps will light when the control circuit for one of the pumps is established, lamp 127 lighting when the control circuit for the first pump is ready for control of the pump, and lamp 126 lighting when the control circuit for the second pump is ready for operation. Keys 128 and 129 are the control keys for controlling the operation of the pumps over the control circuits after they have been established. Control key 129 will start the operation of either of the pumps after either of the control circuits has been established, and control key 128 will cause the pump which is operating to stop. Lamps 131—134 indicate the condition of the pumps at the substation. Lamp 132 will be lit when the first pump is operating and lamp 134 will be lit when the first pump is stopped. Lamp 131 will be lit when the second pump is operating and lamp 133 will be lit when the second pump is stopped. Two telephone type rotary switches are also shown in Fig. 1. The first of these comprises the motor magnet 100 to operate the rotary switch having the banks and wipers 112, 113, 147, 148 and 192. The second of these comprises the motor magnet 175 of the switch having the bank and wiper 191. Two more lamps can also be seen in Fig. 1, these are lamps 123 and 124 which are the line supervisory lamps. Lamp 124 will light if the power fails at the substation or if the lines between the stations should break, and lamp 123 will light when the equipment is normal. The remainder of the apparatus shown in Fig. 1 comprises the various relays and circuits for establishing the various control functions stated above. As can be seen in Fig. 1, the bank contacts of the rotary switches are not completely used. This has been done to simplify the explanation as the control of two pumps only will be described. Thus for additional functions to be controlled, the group of conductors 136 would be connected to other "circuit in readiness" lamps. The conductor groups 137 and 138 would be connected to other alarm circuits, and, as can easily be seen, duplicate control relays and circuits would be added for the additional functions.

To describe the means for interconnecting the control station and the substation, reference is made to Fig. 3. Two frequency modulated carrier wave transmitters and two frequency modulated receivers are shown. These transmitters and receivers are shown as connected across a conventional telephone line. However as stated above these transmitters and receivers could be connected to microwave antenna systems. Circuits are associated with the transmitter 350 such that the control pulses from the control station are sent to the substation and further such that return pulses are sent to the substation from the alarm equipment at the control station. The transmitters produce carrier currents of different frequencies to prevent interaction between a transmitter and a receiver located at the same station. The receiver 370 receives the control pulses from the control equipment and the return alarm pulses from the control station.

The receiver 360 receives the alarm pulses from the alarm equipment and the return pulses from the controlled equipment at the substation. The transmitter 380 sends the alarm pulses from the alarm equipment and the return pulses from the controlled equipment at the substation. The transmitters are so conditioned that when the equipment is at rest the transmitters transmit a steady pulse of one frequency which may be called a space pulse. When one of the circuit keys are operated or if one of the alarms are energized the result is that the frequency of the transmitters are shifted to cause the transmission of pulses of a frequency different from the steady space pulse frequency. These may be called mark pulses. Connected to each receiver is a polar relay. These polar relays are well known three position relays having a nonoperated position and two operated positions. These relays will assume one operated condition when space pulses are received and the other operated condition when mark pulses are received.

To describe the remainder of the control apparatus reference is made to Fig. 4. The pump equipment is not shown, other than the connections to the pump equipment. Two polar relays are shown as controlling the starting and stopping of the pumps. These polar relays are well known two position relays having either one of two operated positions. Relays are also shown, which are connected to the pump equipment, which are energized when either of the pumps is started or stopped. The operation of these relays initiate the return indication to the control station to indicate the state of operation of the pumps at the substation. A telephone type rotary switch is also shown in Fig. 4. This rotary switch comprises the motor magnet 440 and the banks and wipers 432, 433, 434 and 436. The remainder of the apparatus shown in Fig. 4 comprises the various relays and circuits for establishing the various control functions stated above. As was stated above, the control of two pumps only will be described. Thus the bank contacts 432, 433, 434 and 436 are not completely used. If additional functions are to be controlled the group of conductors 451 would be connected to other control relays for starting additional equipment, the group of conductors 452 would be connected to other control relays for stopping additional equipment, the group of conductors 453 would be connected to other indication circuits for indicating the starting of additional equipment, and the group of conductors 454 would be connected to other indication circuits to indicate the stopping of additional equipment.

To describe the alarm equipment, reference is first made to Fig. 2, wherein part of the apparatus at the control station which operates responsive to the alarm equipment at the substation is shown. For purposes of explanation it will be assumed that two alarms are provided, a high temperature alarm and a high pressure alarm. Two lamps are shown in Fig. 2 which indicate the condition of the high temperature alarm. If lamp 202 is lit the high temperature alarm at the substation is operated. If lamp 201 is lit it is indicated that the high temperature alarm is restored. Another pair of similar lamps 203 and 204 are provided for the high pressure alarm. If lamp 204 is lit the high pressure alarm at the substation is operated, and if lamp 203 is lit it is indicated that the high pressure alarm has restored. An alarm bell 207 is also provided for simultaneous operation with either lamp 202 or 204. The alarm bell can be stopped by the operation of the audible alarm reset key 206. Thus if lamp 202 should light to indicate the operation of the high temperature alarm the bell 207 will sound an audible alarm. The alarm reset key can then be operated to restore the bell 207, and if the lamp 204 should then be lit while the lamp 202 is still lit, the alarm bell 207 will again be operated to indicate that the high pressure alarm at the substation has operated. A telephone type rotary switch for synchronized operation with two rotary switches at the substation is also provided. This rotary switch comprises motor magnet 215 and the contact banks and wipers 218, 219, 221 and 222. The remainder of the apparatus shown in Fig. 2 comprises the various relays and circuits for establishing the various alarm functions stated above. As can be seen in Fig. 2 the bank contacts of the rotary switch are not completely used. As was stated above, for the purposes of simplicity of explanation, two alarms only would be described. For additional alarms, additional ones of the bank contacts of the rotary switch would be connected to relays and circuits similar to those shown. Thus the groups of conductors 264, 223 and 224 would be connected to other alarm circuits.

To further describe the alarm equipment, reference is made to Fig. 5 wherein the alarm equipment at the substation is shown. As was stated previously the alarm equipment must close a pair of contacts for each alarm function. This is shown in Fig. 5 as causing the operation of relays 570 and 580. If a high temperature should arise in the pump equipment, relay 570 will operate, and if the temperature returns to normal, relay 570 will restore. If a high pressure should arise in the pump equipment, relay 580 will operate, and if the pressure returns to normal, relay 580 will restore. The apparatus of Fig. 5 is similar to that of Fig. 1, in that a circuit is first set up, then checked, and then causing the functioning of the alarm at the control station. For this purpose two telephone type rotary switches are provided. One of these comprises the motor magnet 520 and the bank contacts and wipers 551, 553 and 513. The other rotary switch comprises the motor magnet 510 and the bank contacts and wiper 514 as can be seen in Fig. 5. The remainder of the apparatus shown in Fig. 5 comprises the various relays and circuits for establishing the various alarm functions stated previously. As can be seen in Fig. 5 the bank contacts 551 and 553 of the rotary switch are not completely used. As was stated above, the conductor groups 572 and 573 would be connected to other alarm circuits. Also the conductor 592 would be multiplied to other alarm circuits.

To describe the operation of the invention in detail reference is made to Figs. 1–5, and Fig. 6 as a guide to the cooperation between Figs. 1–5. When power is applied to the system, relay 320 is energized over the following circuit: battery, relay 320, contacts 309, conductor 13, contacts 111 and 106 to ground. Relay 320 operates and closes a circuit for slow-to-operate relay 315 at contacts 311 which operates after about a one second delay over an obvious circuit. When relay 315 operates it closes its contacts 307 to complete an obvious circuit for the operation of relay 305. Relay 305 operates to close contacts 301 to complete a circuit for the operation of relay 120, but relay 120 is a slow-to-operate relay and does not operate at this time. Relay 305 also operates to close its contacts 306. The closing of contacts 306 causes the transmitter 350 to send a space pulse. The space pulse is transmitted over the line and received by the receiver 370. The space pulse received by the receiver 370 causes the operation of the polar relay 385 and 385'. When the polar relay 385 and 385' operates at this time it causes the closing of contacts 334. This results in an operating circuit for relay 390 which can be traced as follows: battery, relay 390, contacts 334 to ground. Relay 390 operates to close its contacts 333. The closing of contacts 333 causes the transmitter 380 to transmit a space pulse over the line to receiver 360. The space pulse is received by receiver 360 and in turn causes the operation of the polar relay 340 and 340'. The operation of the polar relay 340 and 340' by the space pulse causes the closing of contacts 323 to complete an operating circuit for relay 265 as follows: battery, relay 265, conductor 25, contacts 321, contacts 323, contacts 316, contacts 308 of previously operated relay 315 to ground. Relay 265 operates and completes, at its contacts 261, an obvious operating circuit for relay 260. Relay 260 closes contacts 268 to complete the following circuit for the operation of relay 110: battery, relay 110, conductor 42, contacts 268, conductor 44, contacts 301 to ground. Relay 110 operates to close contacts 119 and to open contacts 121. The opening of contacts 121 prevents any operation of relay 120 at this time. The closing of contacts 119 completes the following circuit for the illumination of lamp 123: battery, lamp 123, contacts 119, conductor 43, conductor 44, contacts 301 to ground. Lamp 123 is illuminated to indicate at the control station that power for the equipment at the substation is present and that the connection between the stations is present. The equipment is now conditioned for operation, since a loop circuit has been completed from the control station to the substation and back to the control station.

Assuming now that the operator desires to control the operation of the first pump, the operator manually operates circuit key 102 to close contacts 107 and 109 and to open contacts 111 and 108. The closing of contacts 107 results in the energization of relay 300 over the following circuit: battery, relay 300, conductor 14, contacts 107 to ground. The opening of contacts 108 results in the removal of ground from the second bank contact of the group 112. When relay 300 operates it closes its contacts 336, 317 and 319, and opens its contacts 316, 318 and 321. This places the functions of the polar relay 340 and 340' into the control section of the system. When relay 300 is operated it breaks the operating circuit for relay 265 at contacts 321. Relay 265, a slow-to-release relay, releases shortly thereafter and breaks the operating circuit for relay 260 which also releases. The closing of contacts 109 results in a holding circuit for relay 305 as follows: battery, relay 305, conductor 15, off-normal springs 266 of the rotary switch operated by motor magnet 215, contacts 267 and 109 to ground. The opening of contacts 111 breaks the operating circuit for relay 320, and relay 320 in restoring breaks the operating circuit for relay 315 which restores. The closing of contacts 319 of relay 300 completes the following operating circuit for relay 155: battery, slow-to-release relay 155, conductor 11, conductor 24, contacts 319, contacts 323, contacts 336, conductor 41, contacts 267, conductor 17, contacts 109 to ground. When relay 155 operates it completes at its contacts 188 an obvious operating circuit for relay 135. Relay 310 is operated by the closure of contacts 107 of the key 102 and contacts 193 of relay 135 by means of the following circuit: battery, relay 310, conductor 16, contacts 193, contacts 151, the wiper of the contact bank 112, the first contact of the contact bank 112, contacts 107 to ground. Relay 310 operates to close its contacts 304. The closing of contacts 304 causes the transmitter to shift its frequency to the mark frequency. This mark frequency is received by the receiver 370 and causes an operation of the polar relay 385 and 385' such that contacts 334 are opened and contacts 328 and 331 are closed. The closing of contacts 328 results in the completion of an operating circuit for the motor magnet 440 of the rotary switch in Fig. 4. This circuit may be traced as follows: battery, motor magnet 440, contacts 401, conductor 36, contacts 527, conductor 35, conductor 30, contacts 328, off-normal springs 327 of the rotary switch comprising motor magnet 510 to ground. The energization of motor magnet 440 causes the closing of contacts 408 which completes an operating circuit for relay 375 over the following path: battery, relay 375, conductor 31, contacts 408, conductor 32, contacts 326 of previously operated relay 390 to ground. The operating circuit for relay 390 was broken at contacts 334, but this relay is a slow-to-release relay so that the operating circuit for relay 375 is completed as relay 390 remains operated. Relay 375 operates to close its contacts 332 to cause the transmitter 380 to transmit a mark pulse. The mark pulse from transmitter 380 is in turn received by receiver 360. This mark pulse causes the polar relay 340 and 340' to assume the opposite operated condition which opens contacts 323 and closes contacts 322. The closing of contacts 322 causes the operation of relay 165 over the following circuit: battery, connected to the wiper of the contact bank 192, through the wiper, the first contact of the contact bank 192, the first contact of the contact bank 191, the wiper of the contact bank 191, contacts 185, conductor 19, conductor 20, relay 165, conductor 12, conductor 22, contacts 317, contacts 322, contacts 336, conductor 41, contacts 267, conductor 17, contacts 109 to ground. The opening of contacts 323 opens the operating circuit for relay 155, but, as this relay is a slow-to-release relay, it remains operated for a short period of time. The operation of relay 165 causes the energization of the motor magnet 175 over the following circuit: battery, motor magnet 175, contacts 169 to ground. Motor magnet 175 closes its pulsing contacts 178 to complete the following circuit for the energization of the motor magnet 100: battery, motor magnet 100, contacts 163 of previously operated relay 135, contacts 178 to ground. The energization of motor magnet 100 causes the breaking of the operating circuit for relay 310 at contacts 151. Relay 310 then restores. When relay 310 restores it causes contacts 304 to open. The opening of contacts 304 causes the mark pulse to end, and the transmitter again sends the space pulse. The end of the mark pulse and the resumption of the space pulse received by the receiver 370 causes the polar relay 385 and 385' to assume the other operated position, whereby contacts 334 are closed and 331 and 328 are open. The closing of contacts 334 again completes the operating circuit for relay 390 before relay 390 has restored, thus maintaining relay 390 operated. The opening of contacts 328 breaks the energization circuit for the motor magnet 440 and as the motor magnet 440 restores it steps the wipers to the second bank contact of the bank contacts 432, 433, 434 and 436. De-energization of motor magnet 440 breaks the operating circuit for relay 375 at contacts 408 which open. The deenergization of motor magnet 440 also causes the closure of off-normal springs 406 and 404 and the opening of off-normal springs 549 in Fig. 5. The closing of springs 404 completes the following operating circuit for slow-to-operate relay 400: battery, relay 400, springs 404, conductor 28, contacts 329, contacts 334 to ground. Relay 375 restores to open its contacts 332 to cause the transmitter 380 to again transmit a space pulse. The space pulse sent from the transmitter 380 is received by the receiver 360 and causes the polar relay 340 and 340' to assume the opposite operated condition, whereby contacts 323 are closed and contacts 322 are opened. The closure of contacts 323 again completes the operating circuit for relay 155 and the opening of contacts 322 breaks the operating circuit for relay 165. Relay 165 restores and opens its contacts 169. The opening of contacts 169 causes the motor magnet 175 to be deenergized. The deenergization of motor magnet 175 causes the wipers to be stepped to the second bank contact of the contact bank 191. The deenergization of motor magnet 175 also causes off-normal springs 166 and 167 to close. The deenergization of motor magnet 175 also causes the deenergization of motor magnet 100 by the opening of contacts 178. The deenergization of motor magnet 100 causes the wipers to step to the second contact of the contact banks 112, 113, 147, 148 and 192. The deenergization of motor magnet 100 also causes off-normal springs 183 to close. The above described operations end one complete loop pulse. To cause another complete loop pulse relay 310 must again be operated. If relay 310 is again operated, another mark pulse is transmitted to the substation and back to the control station to cause another operation of relay 165 which will cause the rotary switches at the control station to step to the next contact of the contact banks. Whether relay 310 operates or not will depend upon the condition of the bank contact of the contact bank 112. If ground is connected to the contact of the contact bank 112 to which the wiper has been removed, relay 310 will again be operated. However in this embodiment the second contact of the contact bank 112, to which the wiper has been stepped, is not connected to ground, since contacts 108 are open. Therefore relay 310 will not operate. Now if no disturbances have been induced into the system to cause a non-synchronized advancing of the three rotary switches described above the three rotary switches will have advanced to the same contact of all of the contact banks. In this embodiment the three rotary switches will have stopped the wipers at the second bank contact. After a brief interval the slow-to-operate relay 145 will operate over the following circuit: battery, relay 145, off-normal springs 166, contacts 177, conductor 11, conductor 24, contacts 319, contacts 323, contacts 336, conductor 41, contacts 267, conductor 17, contacts 109 to ground. Relay 145 operates to close contacts 189, and if, as described above, there has been no disturbances, an operating circuit for relay 180 will be completed as follows: ground, the wiper of the contact bank 192, the second contact of the contact bank 192, the second contact of the contact bank 191, the wiper of the contact bank 191, contacts 189, relay 180 to ground. Relay 180 will then operate to close its contacts 171. Relay 145 also operated to close contacts 181 and 182 to partially prepare circuits for the operation of the lamps 131—134. Lamp 127 will then light over the following circuit: battery, lamp 127, the second contact of the contact bank 113, the wiper of contact bank 113, contacts 171 to ground. As described above lamp 127 is the "circuit in readiness" lamp for the first pump. Thus the operator at the control station is informed that the rotary switch at the substation is at the same position as the two rotary switches in the control station and that he may then control the operation of the first pump.

Assuming that the operator at the control station wishes to start the first pump, he presses the start button 129 to close contacts 195 and to open contacts 196. This action energizes a series of pulse generating relays 130, 140 and 150. The following circuit is completed for relay 130: battery, relay 140, contacts 143, contacts 194, contacts 195 to ground. Relay 130 operates and locks up at contacts 141. Relay 130 completes at contacts 142 an obvious operating circuit for relay 150. Relay 150 operates and at its contacts 144 completes a circuit for the operation of relay 140. Relay 140 operates to open its contacts 143 to break the locking circuit for relay 130 causing relay 130 to restore. When relay 150 operated, it closed its contacts 146 to complete the following circuit for the operation of relay 310: battery, relay 310, conductor 16, contacts 193, contacts 173, contacts 146 to ground. When relay 130 restores, it opens its contacts 142 to break the operating circuit for relay 150, causing relay 150 to restore. When relay 150 restores, it breaks the operating circuit for relay 310, causing relay 310 to restore. This cycle will repeat itself as long as the start button 129 is pressed, thus pulsing relay 310 a number of times. Corresponding to the number of pulses, relay 310 will pulse its contacts 304 to cause the transmitter 350 to send a series of mark pulses to the receiver 370. At this time relay 400 has operated to close contacts 403 and 402. The polar relay 385 and 385' follows the pulses thereby causing contacts 328 to be pulsed. The pulsing of contacts 328 causes a pulsing of relay 435 over the following circuit: battery, relay 435, contacts 402, conductor 36, contacts 527, conductor 35, conductor 30, contacts 328, off-normal springs 327 to ground. Upon the first pulse of relay 435, its contacts 411 will close to energize relay 430 over an obvious circuit. Relay 430 will remain operated during the remainder of the pulsing of relay 435 due to its slow-to-release characteristics. Relay 430 in operating will close its contacts 417 and 422. The closure of contacts 422 will complete a holding circuit for relays 390 and 400. The closure of contacts 417 will partially complete an operating circuit for relay 420. Although at the first pulse of relay 435, contacts 414 are closed, relay 425 will not operate before the end of the pulse, due to its slow-to-operate characteristics. Thus relay 425 will not operate during the pulsing of relay 435. At the end of the first pulse relay 435 restores to close its contacts 416 to complete the operating circuit for relay 420. Relay 420 will operate and at its contacts 418 completes the following holding circuit: battery, relay 420, contacts 418, contacts 419, contacts 403, contacts 326 to ground. This ground at contacts 326 will also energize the two position polar relay 450 and 450' over the following circuit: battery, winding 450, the second contact of the contact bank 432, the wiper of the contact bank 432, contacts 412, contacts 403, conductor 32, contacts 326 to ground. Polar relay 450 and 450' will operate to close contacts 439 and open contacts 441 to complete an obvious circuit for starting the first pump.

When the first pump starts operating, relay 470 will be operated and will close its contacts 444 to complete the following operating circuit for relay 415: battery, relay bank 434, the second contact of the contact bank 434, 415, contacts 426, contacts 429, the wiper of contact contacts 444 to ground. Relay 415 operates to close contacts 423 and 428. The closure of contacts 423 completes an obvious holding circuit for relay 415. The closure of contacts 428 completes an obvious operating circuit for relay 405. Relay 405 operates to complete an operating circuit for relay 375 at contacts 424 and for relay 410 at contacts 427. Relay 410 operates and breaks the holding circuit for relay 415 causing relay 415 to restore. Meanwhile relay 375 is operated over the following circuit: battery, relay 375, conductor 31, contacts 424 to ground. When relay 423 restores, the operating circuit for relay 405 is broken causing relays 375 and 410 to restore. When relay 410 restores the operating circuit for relay 415 is again completed and the cycle is repeated causing relay 375 to be pulsed. Relay 375 operates to pulse contacts 332. Contacts 332 pulse to cause the transmitter 380 to send a series of mark pulses. Receiver 360 receives the series of mark pulses and the polar relay 340 and 340' follows these pulses, whereby contacts 322 and 323 are alternately opened and closed. On the first pulse contacts 322 are closed to complete the following operating circuit for relay 125: battery, relay 125, contacts 174, conductor 12, conductor 22, contacts 317, contacts 322, contacts 336, conductor 41, contacts 267, conductor 17, contacts 109 to ground. Relay 125 operates to complete an obvious operating circuit for relay 115 at contacts 115. Relay 176 operates to close contacts 172 and 156. Ground on contacts 172 provides a holding circuit for relay 155. Contacts 156 partially prepare an operating circuit for relay 190. When relay 125 operated contacts 157 were closed to provide an operating circuit for relay 105, but as relay 105 is a slow-to-operate relay it does not operate during pulsing. At the end of the first pulse relay 125 restores to complete an obvious operating circuit for relay 190. Relay 190 operates before the second pulse energizes relay 125, and locks itself operated through contacts 153 and 182 to ground. Relay 190 operates to close contacts 149 thereby completing the following circuit for the operation of two position polar relay 170 and 170': battery, winding 170, the second contact of the contact bank 147, the wiper of the contact bank 147, contacts 149 to ground. The polar relay 170 and 170' then operates to close contacts 197 and open 198. An obvious circuit for lighting lamp 132 is then completed and lamp 132 lights to indicate at the control station that the first pump at the substation is operating. If the operator at the control station then releases the start button 129, the ground at contacts 195 will no longer operate relay 130 and relays 130, 140 and 150 will no longer send a series of pulses. The operating circuit for relay 310 will also be open and relay 310 will no longer pulse. Contacts 304 will open and the transmitter 350 will again send the space pulse. Receiver 370 will receive the space pulse and polar relay 385 and 385' will operate to close contacts 334 and open contacts 328 and 331. Since contacts 328 are open, relay 435 will no longer be pulsed and relay 435 will restore. Contacts 411 will open to cause relay 430 to restore.

To return the rotary switches and circuits to normal, the operator then releases the circuit key 102. Releasing the circuit key 102 causes contacts 111 and 108 to be closed and contacts 107 and 109 to be opened. The opening of contacts 107 causes relay 300 to restore. Relay 300 restores to break the operating circuit for relay 305 and relay 155. The holding circuit for relay 305 and relay 155 is also open by the contacts 109. The opening of contacts 107 also removes ground from the first bank contact of the contact bank 112. Relays 305 and 155 restore and as relay 155 restores it breaks the operating circuit for relay 135 which then restores. When relay 305 restores it opens its contacts 306, and this opens the loop circuit to the substation. Thus the transmitter 350 sends no pulses. As neither the space pulse or the marker pulse is received by the receiver 370, polar relay 385 and 385' assumes the center or neutral position, as shown in Fig. 3, wherein contacts 334, 328 and 331 are open. The opening of contacts 334 breaks the operating circuit for relay 390. Since relay 430 has restored to open its contacts 422, the holding circuit for relay 390 and relay 400 is broken, and relays 390 and 400 restore. As relays 390 and 400 restore, the holding circuit for relay 420 is broken at contacts 326 and 403. Relay 420 then restores. The rotary switches automatically restore by means of self-interrupted operation of the motor magnets 440, 100 and 175. The motor magnet 100 operates over the following circuit to automatically return to normal: battery, motor magnet 100, contacts 162, interrupter springs 161, off-normal springs 183, conductor 18, contacts 302 to ground. As the motor magnet 100 is energized it opens the interrupter springs 161 causing the motor magnet to be deenergized and causing the wipers of the rotary switch to be stepped to the next contact. As motor magnet 100 deenergizes, interrupter springs 161 close to again complete the energization circuit for motor magnet 100. These energizations and deenergizations of the motor magnet 100 result in the automatic stepping of the rotary switch until the wipers are returned to the first bank contacts. As the wipers are stepped to the first bank contacts, the off-normal springs 183 associated with the motor magnet 100 are opened to thereby prevent any further energization of the motor magnet 100. The rotary switch comprising motor magnet 100 and contact banks 112, 113, 147, 148 and 192 is then in its normal condition. Motor magnet 175 operates in a similar manner to return its rotary switch to normal. The circuit for the energization of motor magnet 175 is as follows: battery, motor magnet 175, interrupter springs 179, contacts 168, off-normal springs 167, conductor 18, contacts 302 to ground. As motor magnet 175 is energized it opens its interrupter springs 179 to break its energization circuit causing it to restore and step the wiper of the contact bank 191 one step. This stepping continues until the rotary switch comprising motor magnet 175 and contact bank 191 returns to normal, at which time off-normal springs 166 and 167 are opened, thereby preventing any further energization of motor magnet 175. Motor magnet 440 also returns its rotary switch to normal in a manner similar to the restoration of the first rotary switch described above. The energization circuit for motor magnet 440 is as follows: battery, motor magnet 440, interrupter springs 407, off-normal springs 406, conductor 33, contacts 324 to ground. As motor magnet 440 is energized it opens its interrupter springs 407 to break its energization circuit and upon the deenergization thereof to step the wipers to the next bank contacts. Interrupter springs 407 are closed again to cause a further energization of motor magnet 440, and further stepping continues until the rotary switch comprising motor magnet 440 and contact banks 432, 433, 434 and 436 is returned to normal. When the rotary switch is returned to normal off-normal springs 406 are opened to prevent further stepping of the rotary switch. Connected to each motor magnet is a resistance-capacitor network which is well known in the art as an aid to the suppression of sparking across the interrupter springs as they are opened and closed. As can be seen in the drawings, motor magnet 100 has the network comprising resistor 130 and capacitor 139' connected in series thereto and to ground. Motor magnet 175 has the network comprising resistor 186 and the capacitor 186' connected thereto, motor magnet 215 has the network comprising resistor 217 and the capacitor 217' connected thereto, motor magnet 440 has the network comprising resistor 409 and the capacitor 409' connected thereto, the motor magnet 510 has the network comprising resistor 509 and the capacitor 509' connected thereto, and the motor magnet 520 has the network comprising resistor 593 and capacitor 593' connected thereto. To continue with the description of the operation of the equipment when the circuit key is released, the closing of contacts 111 upon the release of circuit key 102 again completes the operating circuit for relay 320. The operation of relay 320 was described in detail above when power was applied to the system. As was also described above, the operation of relay 320 causes the operation of relay 315 after about a one second delay. The operation of relay 315 causes the operation of relay 305, and the operation of relay 305 results again in the closing of contacts 306 to cause the space pulse to be transmitted by the transmitter 350. This results in the re-establishment of the loop circuit from the control station to the substation and back to the control station. The period of time during which the loop circuit is open is about two seconds, during which time the equipment has restored as described above. Before the reoperation of relay 320 all the relays have restored, so that upon the re-establishment of the loop circuit the operated relays are relays 320, 315, 305, 265, 260 and 390. However it should be noted that relay 470 in the pump equipment is still operated as the first pump was placed in the operating condition. This pump will continue to operate until it has been stopped. The polar relay 450 and 450' will remain in the position to which it was last operated. At this time contacts 439 will be closed and contacts 441 will be opened. At the control station the polar relay 170 and 170' will also remain in the position to which it was last operated, namely, contacts 197 will be closed and contacts 198 will be open. Thus lamp 132 will remain lit to indicate that the first pump is operating.

Assuming next that the operator at the control station desires to stop the first pump, the circuit key for the first pump, circuit key 102, must be operated to establish a control circuit for the first pump. The establishment of the control circuit for the first pump has been described in detail and therefore need not be described again. Assuming therefore that the circuit key 102 has been operated and that the operator at the control station has received the visual indication by means of lamp 127 being lit that the control circuit to the first pump is in readiness for operation. The operator at the control station then presses the stop button 128 causing contacts 187 to close and contacts 194 to open. The closing of contacts 187 completes a circuit for the operation of relay 310 as follows: battery, relay 310, conductor 16, contacts 193, contacts 173, contacts 195, contacts 187 to ground. Relay 310 operates to close contacts 304. The closing of contacts 304 causes the transmitter 350 to send a steady mark pulse. The mark pulse is received by receiver 370 and causes the polar relay 385 and 385' to assume the opposite operated position wherein contacts 328 and 331 are closed and contacts 334 are opened. The closure of contacts 328 completes the following operating circuit for relay 435: battery, relay 435, contacts 402, conductor 36, contacts 527, conductor 35, conductor 30, contacts 328, off-normal springs 327 to ground. Relay 435 operates to complete an obvious operating circuit for relay 430 at contacts 411. Relay 435 also closes contacts 414 to complete an obvious circuit for the operation of relay 425. As previously described, relay 435 was pulsed to pulse its contacts 414 and 416, to cause the operation of relay 420 and prevent the operation of relay 425 which is a slow-to-operate relay. However, at this time relay 435 is not pulsed, but remains operated. Therefore relay 420 is not operated while relay 425 operates after a brief interval of time. Relay 430 operates to close contacts 422 to hold relays 390 and 400 operated. Relay 425 operates to open its contacts 419 to prevent any operation of relay 420, to close its contacts 413 to complete a holding circuit for relay 425, to close contacts 431 to partially complete a circuit for the operation of relay 375, and to close its contacts 421 to complete the following circuit for the operation of the polar relay 450 and 450': battery, winding 450', the second contact of the contact bank 433, the wiper of the contact bank 433, contacts 421, contacts 403, conductor 32, contacts 326 to ground. Polar relay 450 and 450' assumes the opposite operated condition whereby contacts 441 are closed and contacts 439 are opened. The opening of contacts 439 breaks the start circuit to the first pump, and the closing of contacts 441 completes an obvious stop circuit for the first pump. When the first pump stops, relay 470 will restore, and relay 475 will be operated to initiate a return indication to the control station that the first pump has stopped. Contacts 446 will be closed to complete the following circuit for the operation of relay 375: battery, relay 375, conductor 31, contacts 431, the wiper of the contact bank 436, the second contact of the contact bank 436, contacts 446 to ground. Relay 375 operates to close its contacts 332 to cause the transmitter 380 to send a mark pulse. The mark pulse received by the receiver 360 causes the polar relay 340 and 340' to assume the opposite operated position whereby contacts 322 are closed and contacts 323 are opened. The following operating circuit for relay 125 is then completed: battery, relay 125, contacts 174, conductor 12, conductor 22, contacts 317, contacts 322, contacts 336, conductor 41, contacts 267, conductor 17, contacts 109 to ground. Relay 125 operates to close its contacts 176 and 157. Contacts 176 complete an obvious operating circuit for relay 115. Contacts 157 complete an obvious operating circuit for relay 105. Relay 115 completes, at contacts 172, a holding circuit for relays 155 and 145. Relay 105 operates to close its contacts 152 and 159 and to open its contacts 154. Open contacts 154 prevent any operation of relay 190. Closed contacts 159 complete a holding circuit for relay 105. Closed contacts 152 complete the following circuit for the operation of the polar relay 170 and 170': battery, winding 170', the second bank contact of the contact bank 148, the wiper of the contact bank 148, contacts 152 to ground. Polar relay 170 and 170' operates to assume the opposite operated position whereby contacts 198 are closed and contacts 197 are open. Closed contacts 198 complete an obvious circuit for the operation of lamp 134. Lamp 132 which previously indicated that the first pump was operating is extinguished and lamp 134 which indicates that the first pump has stopped is illuminated. The operator at the control station may then release the stop button 128 and this will break the operating circuit for relay 130 which will restore to cause the transmitter to stop sending the mark pulse and to again transmit the space pulse. The space pulse will be received by the receiver 370 to cause the polar relay 385 and 385' to assume the opposite operated position whereby contacts 334 will be closed and contacts 328 and 331 will be opened. The opening of contacts 328 will break the operating circuit for relay 435 which will restore. To return the rotary switches and circuits to normal, the operator then releases the circuit key 102. As previously described in detail, this opens the loop circuit for about two seconds during which time the rotary switches and circuits return to normal. The relay 475 in the pump equipment will remain operated as the first pump is stopped, and the polar relays 450 and 450', and 170 and 170' will remain in the position to which they were last operated. Thus lamp 134 will continue to be illuminated.

The control of the second pump is very similar to the control of the first pump as has been previously described. To control the second pump the circuit key 101 must be operated to close contacts 103 and 114 and to open contacts 104 and 106. The closing of contacts 103 initiates the operation of the system to establish a circuit over which the second pump may be controlled. The opening of contacts 104 removes ground from the third contact of the contact bank 112 so that relay 310 which initiates the mark pulses from the transmitter 350, which are received by the receiver 370, which in turn cause the operation of the motor magnet 440, and which are in turn transmitted from the transmitter 380 to the receiver 360 to cause the operation of relay 165, which in turn causes the stepping of the motor magnets 100 and 175, will not operate when the wiper of the contact bank 112 has been stepped to the third contact of that contact bank. Where previously the wipers had been stopped on the second contact of the various contact banks, now the wipers will be stopped on the third contact of the various contact banks. If no interference has been induced into the system to cause a non-synchronized stepping of the various rotary switches, the following circuit will be completed for relay 180: battery, the wiper of the contact bank 192, the third contact of the contact bank 192, the third contact of the contact bank 191, the wiper of the contact bank 191, contacts 189, relay 180 to ground. Relay 180 will operate to complete the following circuit for lamp 126: battery, lamp 126, the third contact of the contact bank 113, the wiper of the contact bank 113, contacts 171 to ground. Lamp 126 will then be illuminated to indicate to the operator at the control station that a circuit is in readiness for control of the second pump. The operator at the control station may then press the start button 129 to start the second pump at the substation. The closing of contacts 195 and the opening of contacts 196 of the start button 129 will cause the relays 130, 140 and 150 to operate, in the manner described previously, to cause relay 310 to be pulsed. Relay 310 will pulse to cause the transmitter 350 to send a series of mark pulses. These mark pulses will be received by the receiver 370 and will cause relay 435 to pulse. The pulsing of relay 435 will cause a start circuit to be completed for the second pump. This start circuit for the second pump is completed in a manner similar to the start circuit described previously for the first pump. This start circuit may be traced as follows: battery, winding 445 of the two position polar relay 445 and 445', the third contact of the contact bank 432, the wiper of the contact bank 432, contacts 412, contacts 403, conductor 32, contacts 326 to ground. The polar relay 445 and 445' will assume the position whereby contacts 437 are closed and contacts 438 are opened. The closing of contacts 437 completes an obvious circuit for the operation of the second pump. When the second pump starts to operate relay 455 is energized to close contacts 442. The closing of contacts 442 completes a circuit through the third contact of the contact bank 434 for the operation of relays 405, 410 and 415. These relays operate, in a manner similar to that described for the first pump, to pulse relay 375. Relay 375 operates to pulse its contacts 332, to cause the transmitter 380 to send a series of mark pulses. These mark pulses are received by the receiver 360 and in turn cause relay 125 to be pulsed. Relay 125 in pulsing causes the operation of relays 115 and 190, in a manner similar to that previously described for the first pump, to complete the following circuit for the operation of the two position polar relay 160 and 160′: battery, winding 160, the third contact of the contact bank 147, the wiper of the contact bank 147, contacts 149 to ground. Polar relay 160 and 160′ operates to close contacts 199 and open contacts 184. The closing of contacts 199 completes an obvious circuit for the illumination of lamp 131 which lights to indicate that the second pump is operating.

The operator at the control station may then release the push button 129 and the previously described pulsing circuits will stop pulsing. The operator may then release the circuit key 101, and as previously described for the release of the circuit key 102, the rotary switches and circuits will return to normal as the loop circuit is opened for about two seconds. Relay 455 in the pump equipment will remain operated as the second pump is operating, and the polar relay 445 and 445′ will remain in the position to which it was last operated. Also, polar relay 160 and 160′ will remain in the position to which it was last operated. Thus contacts 199 will remain closed and the lamp 131 will remain illuminated to indicate that the second pump is operated.

To stop the second pump after the rotary switches and circuits have returned to normal, the operator at the control station must again operate the circuit key 101 to cause the re-establishment of the circuit over which the second pump may be controlled. When this has been done and lamp 126 is again illuminated to indicate that the circuit is in readiness, the operator may then press the push button 128 to cause the second pump to stop. The stopping of the second pump is very similar to that described for the stopping of the first pump, except that the various required circuits are completed through the third bank contact of the various contact banks rather than the second bank contact of the various contact banks as described above for the stopping of the first pump.

It can be seen from the foregoing description that the equipment need not be operated exactly in the manner described. Once one of the circuits for control of one of the pumps has been established, more than one function can be accomplished over that circuit. In other words, after the operator at the control station has operated one of the circuit keys and received the return indication that the circuit is in readiness, the operator may press the start button to start the pump associated with the operated circuit key, and after some period of operation, the operator may press the stop push button to stop the operating pump, and only thereafter releasing the circuit key to return the equipment to normal. Also both pumps may be operated at the same time. The operator can operate one of the circuit keys to set up the circuit over which that pump may be controlled, and the operator may then cause that pump to start operating. The operator may then restore the operated circuit key and operate the other circuit key to set up a circuit for the operation of the other pump, and the operator may then cause the other pump to start operating, whereby both pumps will be operating at the same time.

Turning next to a detailed description of the operation of the alarm equipment and assuming that power has been applied to the equipment. As previously described the operated relays at this time are relays 110, 260, 265, 305, 315, 320 and 390. Although not previously described, relay 530 is also operated over the following circuit: battery, relay 530, conductor 34, conductor 32, contacts 326 to ground. If an abnormally high pressure should occur in the pump equipment, relay 580 will operate to close its contacts 582. The closing of contacts 582 will complete a circuit through the lower winding of the relay 575. Relay 575 has two windings thereon and the energization of the lower winding will result in the closing of contacts 578 and 589 only. The circuit for the energization of the lower winding of relay 575 is as follows: battery, lower winding of relay 575, contacts 579, contacts 582 to ground. The closing of contacts 578 results in the connection of the upper winding of relay 575 to the second contact of the contact bank 551. The closing of contacts 589 completes the following operating circuit for relay 555: battery, relay 555, contacts 551, off-normal springs 549, contacts 591, contacts 589 to ground. Relay 555 operates to close its contacts 539. The closing of contacts 539 completes the following circuit for the energization of the motor magnet 520: battery, motor magnet 520, contacts 503, contacts 539, contacts 541, contacts 546 to ground. As previously described the contact banks 551, 553 and 513 are associated with the motor magnet 520, and the contact bank 513 is associated with the motor magnet 510. As the motor magnet 520 is energized, it closes its pulsing springs 517 to complete the following circuit for the operation of relay 500: battery, the upper winding of relay 500, pulsing springs 517, contacts 547 to ground. Relay 500 has two windings thereon, and the lower winding is shunted by contacts 502 when relay 500 operates. This makes relay 500 slow acting. Relay 500 operates to close its contacts 501, to complete an obvious circuit over conductors 26 and 27 to the transmitter 380 to cause the transmitter 380 to send a mark pulse. The mark pulse is received by the receiver 360 which causes the polar relay 340 and 340′ to assume the operated position wherein contacts 322 are closed and contacts 323 are opened. The opening of contacts 323 breaks the operating circuit for relay 265 but since relay 265 is a slow-to-release relay it does not restore at this time. The closing of contacts 322 completes the following circuit for the energization of motor magnet 215: battery, motor magnet 215, contacts 256, conductor 23, contacts 318, contacts 322, contacts 316, contacts 308 to ground. Motor magnet 215 is energized to close its pulsing contacts 227 to complete the following circuit for the operation of relay 310: battery, relay 310, conductor 16, conductor 10, contacts 227, contacts 259 to ground. Relay 310 operates to close its contacts 304. The closing of contacts 304 causes the transmitter 350 to send the mark pulse. This mark pulse is received by the receiver 370 and causes the polar relay 385 and 385′ to assume the operated position wherein contacts 328 and 331 are closed and contacts 334 are opened. The closing of contacts 331 completes the following circuit for the energization of the motor magnet 510: battery, motor magnet 510, conductor 44, conductor 29, contacts 331, conductor 40, contacts 534 of previously operated relay 555 to ground. Motor magnet 510 energizes to close its pulsing springs 511 to complete an obvious circuit for the operation of relay 515. Relay 515 operates and completes the following locking circuit: battery, relay 515, contacts 512, contacts 521, contacts 547 to ground. Thus a loop mark pulse has been initiated at the substation, transmitted to the control station and returned to the substation. Returning to the point where relay 500 was operated, the closing of pulsing springs 517 also completed the following circuit for the operation of relay 505: battery, relay 505, contacts 506, pulsing springs 517, contacts 547 to ground. Relay 505 operates to open its contacts 503 and 506 and close its contacts 504. Contacts 504 and 506 are make-before-break contacts whereby contacts 504 are closed before contacts 506 are opened. The opening of contacts 503 breaks the energization circuit for the motor magnet 520 and the motor magnet deenergizes and advances the wipers of the contact banks 551, 553 and 513 one step. The closing of contacts 504 completes the following holding circuit for relay 505: battery, relay 505, contacts 504, contacts 521, contacts 547 to ground. When motor magnet 520 deenergizes, pulsing springs 517 were opened to break the operating circuit for relay 500. After a short interval, relay 500 restores to open its contacts 501. The opening of contacts 501 causes the transmitter 380 to cease sending the mark pulse and to again send the space pulse. The end of the mark pulse and the reception of the space pulse by the receiver 360 causes the polar relay 340 and 340′ to assume the opposite operated position, whereby contacts 322 are opened and contacts 323 are closed. The closing of contacts 323 again completes the operating circuit for relay 265 before relay 265 has restored. The opening of contacts 322 breaks the energization circuit for motor magnet 215. Motor magnet 215 deenergizes and thereby steps the wipers of the contact banks 218, 219, 221 and 222 to the second contact of these contact banks. Pulsing springs 227 open when motor magnet 215 is deenergized and the opening of these springs breaks the operating circuit for relay 310. Relay 310 restores and opens its contacts 304. The opening of contacts 304 causes the transmitter 350 to cease sending the mark pulse and to again send the space pulse. The end of the mark pulse and the reception of the space pulse by the receiver 370 causes the polar relay 385 and 385' to assume the opposite operated position, whereby contacts 334 are closed and contacts 328 and 331 are opened. The opening of contacts 331 breaks the circuit for motor magnet 510 and motor magnet 510 deenergizes to advance the wiper of the contact bank 514 to the second contact of that contact bank. Now if no interference has been induced into the system to cause a non-synchronized stepping of the three motor magnets 510, 520 and 215, the following circuit for the operation of relay 525 will be completed: battery, relay 525, the wiper of the contact bank 514, the second contact of the contact bank 514, the second contact of the contact bank 513, the wiper of the contact bank 513, contacts 507 to ground. When relay 525 operates it opens its contacts 521 to break the holding circuits for relays 505 and 515. As relays 505 and 515 restore, the energization circuit for motor magnet 520 will again be completed and the stepping cycle will take place again causing the wipers to be advanced in steps until the upper winding of relay 535 is connected in series with the upper winding of relay 575. In this embodiment the upper winding of relay 535 is connected to the upper winding of relay 575 after the rotary switches have advanced one step, therefore in this embodiment the cycle would not be repeated. The stepping of the three rotary switches caused the closing of the following off-normal springs: 312, 236, 263, 593 and 519, and the opening of the following off-normal springs: 327 and 266. The closing of off-normal springs 312 partially prepares a holding circuit for relay 325. The closing of off-normal springs 236 partially prepares a circuit for the automatic restoration of the motor magnet 215. The closing of off-normal springs 263 completes the following circuit for the operation of relay 255: battery, relay 255, off-normal springs 263, contacts 262, conductor 25, contacts 321, contacts 323, contacts 316, contacts 308 to ground. The closing of off-normal springs 593 partially prepares a circuit for the automatic restoration of the motor magnet 510. The closing of off-normal springs 519 partially completes a circuit for the automatic restoration of the motor magnet 520. The opening of off-normal springs 327 prevents a false operation of motor magnet 440 while the alarm equipment is operating. The opening of off-normal springs 266 prevents any false operation of relay 305 while the alarm equipment is operating. Now, when the motor magnet 520 stepped the wiper of the contact bank 551 to the second contact of that contact bank, the following circuit is completed: battery, the upper winding of relay 575, contacts 578, contacts 577, the second contact of the contact bank 551, the wiper of the contact bank 551, contacts 531, the upper winding of relay 535 to ground. The energization of the upper winding of relay 535 will cause the closing of contacts 528 only. The closing of contacts 528 prepares the following circuit for the complete operation of relay 535: battery, the lower winding of relay 535, contacts 528, pulsing springs 516, contacts 547 to ground. Relay 535 then operates fully to close its contacts 523 and 537, and to open its contacts 546 and 544. The opening of contacts 546 prevents and further operation of the motor magnet 520 and as previously described the rotary switches will remain with their wipers connected to the second contact of the various contact banks. The opening of contacts 544 prevents any false operation of the motor magnet 510. The energization of the upper winding of the relay 575 causes this relay to fully operate. Contacts 576 and 577 are make-before-break contacts and contacts 576 close before contacts 577 open. Contacts 581 and 579 are also make-before-break contacts and contacts 581 close before contacts 579 open. Also, contacts 583 are closed and contacts 591 are opened. The opening of contacts 591 breaks the operating circuit for relay 555 and relay 555 restores. The closing of contacts 583 prepares a circuit for the operation of relay 585, but relay 585 will not operate since the battery connected to it through the resistor 586 is shunted by the ground on contacts 582. The opening of contacts 577 breaks the operating circuit for relay 575, but the closing of contacts 576 has completed an obvious holding circuit for relay 575. Returning to the results of the operation of relay 535, the closing of contacts 537 completes an obvious circuit for the operation of relay 550. Relay 550 operates to close contacts 533 thereby completing an obvious circuit for the operation of the slow-to-operate relay 545. The time interval between the closing of contacts 537 and the operation of relay 545 is about one second. Contacts 522 and 524 close upon the operation of relay 545 and contacts 522 complete the following circuit for the operation of relay 415: battery, relay 415, contacts 426, conductor 38, contacts 523, contacts 522 to ground. As previously described, relays 405, 410 and 415 operate in cycles to cause a pulsing of relay 375, and as previously described this pulsing cycle is initiated with the operation of relay 415. Also as previously described, the pulsing of relay 375 results in the sending of a series of mark pulses from the transmitter 380. These pulses are in turn received by the receiver 360 and the polar relay 340 and 340' will operate to follow the pulses, thus alternately opening and closing contacts 322 and 323. Now, since relay 255 is operated due to the closure of the off-normal springs 263, the following circuit for the operation of relay 220 will be completed upon the first mark pulse: battery, relay 220, contacts 257 of relay 255, conductor 23, contacts 318, contacts 322, contacts 316, contacts 308 to ground. Relay 220 will operate to close its contacts 237 and 238 and to open contacts 239. The closing of contacts 237 completes an obvious circuit for the operation of relay 225. The closing of contacts 238 completes an obvious circuit for the operation of relay 230. Relay 225 is a slow-to-release relay and will operate upon the first pulse, however relay 230 is a slow-to-operate relay and the series of mark pulses are not of sufficient duration to cause the operation of relay 230 at this time. Relay 225 operates to close contacts 241 and 242. The closing of contacts 242 completes an obvious holding circuit for relays 265 and 255. Now at the end of the first mark pulse relay 220 will be deenergized, due to the opening of contacts 322, and contacts 239 will be closed and contacts 238 will be opened. The closing of contacts 239 completes the following circuit for the operation of relay 235: battery, relay 235, contacts 244, contacts 241, contacts 239 to ground. Relay 235 is a slow acting relay and will not operate upon the first deenergization of relay 220, but relay 235 is so adjusted that upon the third or fourth deenergization of relay 220 it will operate. Relay 235 will operate to close contacts 228, 229, 231 and 233. The closing of contacts 233 completes the following circuit for the operation of relay 210: battery, relay 210, the second contact of the contact bank 222, the wiper of the contact bank 222, contacts 233 to ground. Relay 210 will operate to close contacts 214 and 216. The closing of contacts 214 completes an obvious holding circuit for relay 210. The closing of contacts 216 completes an obvious circuit for the operation of the alarm bell 207 which will sound an alarm. The closing of contacts 229 completes the following holding circuit for relay 235: battery, relay 235, contacts 229, contacts 258, contacts 259 to ground. The closing of contacts 228 completes the following circuit for the operation of the polar relay 205 and 205': battery, winding 205', the second contact of the contact bank 218, the wiper of the contact bank 218, contacts 228, contacts 258, contacts 259 to ground. Polar relay 200 and 200', and polar relay 205 and 205' are two position polar relays, the armatures of which remain in the position to which they have been last operated. Therefore the armature of the polar relay 205 and 205' will operate to open contacts 211, to extinguish alarm lamp 203 and to close contacts 212 to complete an obvious circuit for the illumination of lamp 204 to indicate to the operator at the control station that an abormally high pressure has arisen in the pump equipment at the substation. Now it must be noted that when relay 255 operated to close contacts 258 the following circuit for relay 250 was completed: battery, relay 250, contacts 252, contacts 258, contacts 259 to ground. Relay 250 is a slightly slow-to-operate relay. Relay 250 operates to close contacts 253 and 251. The closing of contacts 253 provides an alternate ground in place of the ground at contacts 259. Contacts 251 are closed to complete an obvious circuit for the operation of relay 240. Relay 240 operates to complete an obvious circuit for the operation of relay 245 at contacts 247. Relay 245 operates to open contacts 252 to break the operating circuit for relay 250. Relay 250 restores and opens contacts 251 to cause relay 240 to restore which in turn restores to open contacts 247 to cause relay 245 to restore. The restoration of relay 245 again completes the operating circuit for relay 250 and the cycle of operation of the three relays 240, 245 and 250 is repeated such that the contacts 248 of relay 240 are pulsed at a speed of approximately 120 times a minute. The pulsing of contacts 248 completes and breaks the following shunt circuit about lamp 204: battery, resistor 249, contacts 248, contacts 231, the wiper of the contact bank 221, the second contact of the contact bank 221, to the circuit for the illumination of the lamp 204. Thus the alarm lamp 204 will be flashed on and off at a rate of approximately 120 times per minute. Returning to the point at which relay 255 was operated, the closing of contacts 258 also completed the following circuit for the operation of relay 330: battery, relay 330, conductor 21, contacts 258, contacts 259 to ground. Relay 330 operated to close contacts 314 thereby completing an obvious circuit for the operation of relay 325. Relay 325 is a slow-to-operate relay and the time interval between the energization of relay 330 and the operation of relay 325 is approximately three seconds. Relay 325 operates to open contacts 309 thereby breaking the operating circuit for relay 320. Relay 320 restores opening contacts 311, thereby breaking the operating circuit for relay 315. Relay 315 will restore and open contacts 307 and 308. The opening of contacts 307 will break the holding circuit for relay 305 and relay 305 will restore. When relay 305 restores contacts 306 will open and since contacts 304 were previously opened, the transmitter 350 will send neither the space pulse nor the mark pulse. This causes an opening of the loop between the control station and the substation similar to that previously described for the restoration of the equipment after the operation of one of the control functions. Thus the polar relay 385 and 385' will assume the neutral position wherein contacts 328, 331 and 334 are opened. The opening of contacts 334 breaks the operating circuit for relay 390, and relay 390 restores to open contacts 326 and 333. The opening of contacts 326 breaks the operating circuit for relay 530. Relay 530 restores to open contacts 531 and 547 and to close contacts 548. The opening of contacts 531 breaks the energization circuit for the upper winding of relay 535. The opening of contacts 547 breaks the holding circuits for relays 535, 505 and 515 and these relays restore. The closing of contacts 548 completes the following circuit for the operation of motor magnet 520: battery, motor magnet 520, interrupter springs 518, off-normal springs 519, contacts 548 to ground. Similar to the rotary switches in the control equipment, motor magnet 520 will be energized and deenergized due to the opening and closing of the interrupter springs 518 to move the wipers of contact banks 551, 553 and 513 to the first contact of these banks at which time off-normal springs 519 will open to prevent any further stepping of the rotary switch. Relay 535 will restore to open contacts 523, 528 and 537 and to close contacts 546 and 544. The opening of contacts 523 breaks the operating circuit for relay 415 and the three relays 405, 410 and 415 will no longer operate in cycles to pulse relay 375. Relay 375 will remain restored, and thus no further mark pulses will be sent. The opening of contacts 528 prevents any false operation of relay 535. The opening of contacts 537 breaks the operating circuit for relay 550 which restores to open contacts 533. The opening of contacts 533 breaks the operating circuit for relay 545 which restores. The closing of contacts 546 provides an alternate ground in place of the ground at contacts 548. The closing of contacts 544 completes the following circuit for the operation of the motor magnet 510: battery, motor magnet 510, interrupter springs 508, off-normal springs 593, contacts 542, contacts 543, contacts 544 to ground. Similarly to the operation of motor magnet 520 motor magnet 510 is energized and deenergized, due to the opening and closing of the interrupter springs 508, to return the wiper of the contact bank 514 to the first contact thereof, whereupon off-normal springs 593 open to prevent any further stepping of the rotary switch. Thus all the alarm equipment at the substation is returned to normal except relay 575 which remains operated. The relay 580 in the pump alarm equipment also remains operated as long as an abnormally high pressure exists within the pump equipment. Returning to the point at which relay 390 restored, the opening of contacts 333 caused the transmitter to stop sending the space pulse. This causes the polar relay 340 and 340' to assume the neutral position wherein contacts 322 and 323 are open. The opening of contacts 322 breaks the operating circuit for relay 220. Relay 220 restores to open contacts 237. The opening of contacts 237 breaks the operating circuit for realy 225 which restores after a short period of time. Relay 225 restores to open contacts 241 and 242. The opening of contacts 241 breaks the operating circuit for relay 235. The opening of contacts 242 removes holding ground from relays 255 and 265. The opening of contacts 323 breaks the operating circuit for relays 265 and 255. Relay 255 restores when contacts 242 open and relay 265 which is a slow-to-release relay restores a short interval of time thereafter. The opening of contacts 258 breaks the operating circuit for relay 330 and the energization circuit for winding 205 of the polar relay 205 and 205'. The opening of contacts 258 also breaks the holding circuit for relay 235 and the operating circuit for relay 250. Relay 235 restores a short time thereafter. Relay 250 restores and thereby will not operate in the pulsing cycle in conjunction with relays 240 and 245. Since relay 240 is no longer pulsed, but remains restored, the shunt about the illumination circuit for the lamp 204 is removed and the lamp 204 will remain steadily illuminated. When relay 235 restores, it further opens the shunt about the lamp 204 and breaks the operating circuit for relay 210 at contacts 233. When relay 265 restores, contacts 261 open to break the operating circuit for relay 260 which restores. When relay 260 restores, contacts 254 are closed to complete the following circuit for the operation of the motor magnet 215: battery, motor magnet 215, interrupter springs 226, off-normal springs 236, contacts 254 to ground. Motor magnet 215 then operates, due to the opening and closing of the interrupter springs 236, to step the wipers of the contact banks 218, 219, 221 and 222 to the first contact thereof at which time the off-normal springs 236 are opened to prevent any further stepping of the rotary switch. When relay 330 restored, it opened contacts 314 to break the operating circuit for relay 325. The restoration of the rotary switch operated by motor magnet 215 results in the opening of off-normal springs 312 to break the holding circuit for relay 325. Relay 325 restores to close contacts 309. At this point all the relays and switches for the alarm equipment at the control station have restored except relay 210. This relay is maintained in the operated condition over an obvious holding circuit. Should the operator at the control station desire to stop the alarm bell 207, he operates the alarm reset key 206. This breaks the holding circuit for relay 210 which restores to open contacts 216, thereby breaking the operating circuit for the alarm bell 207. It should be noted that although the winding 205' of the polar relay 205 and 205' is no longer energized, the armature will remain in the position to which it was last operated. In other words, contacts 212 will be closed and the lamp 204 will remain illuminated to indicate that an abnormally high pressure exists within the pump equipment. With the restoration of relay 325 the operating circuit for relay 320 is again completed, and, as previously described, this initiates the normal set up of the control equipment whereby the space pulse loop is again completed between the control station and the substation. Thus the polar relay 385 and 385' and the polar relay 340 and 340' will assume the operated position corresponding to the space pulse and relays 305, 265, 260, 315, 320, 390 and 530 will again be operated.

Assuming now that the abnormally high pressure in the pump equipment at the substation is reduced to normal, relay 580 will restore to open contacts 582. The opening of contacts 582 will remove the previously described shunt about relay 585, and relay 585 will partially operate over the following circuit: battery, resistor 586, the upper winding of relay 585, contacts 583 to ground. Relay 585 will operate to close contacts 584 and 587 only. The closing of contacts 587 completes the following circuit for the operation of relay 555: battery, relay 555, contacts 551, off-normal springs 549, contacts 588, contacts 587 to ground. Relay 555 will operate to close contacts 539. The equipment then operates in a manner similar to that described previously for the operation of the high pressure alarm. Thus the closing of contacts 539 causes the energization of the motor magnet 520. The motor magnet in turn closes pulsing springs 517 to cause the operation of relay 500. Relay 500 operates in turn to complete an obvious circuit to the transmitter 380 to cause the transmitter 380 to send a mark pulse. The mark pulse is received by the receiver 360, causing an operation of the polar relay 340 and 340' to close contacts 322. The closing of contacts 322 results in the completion of a circuit for the motor magnet 215. Motor magnet 215 closes pulsing contacts 227 to complete a circuit for the operation of relay 310. In turn relay 310 operates to close contacts 304. The closing of contacts 304 causes the transmitter 350 to send the mark pulse. The mark pulse is received by the receiver 370 and causes the polar relay 385 and 385' to assume the opposite operated position. This results in the completion of a circuit for the energization of motor magnet 510. Motor magnet 510 closes pulsing springs 511 to complete a circuit for the operation of relay 515. Relay 515 locks up. The closing of pulsing springs 517 also completed a circuit for the operation of relay 505. Relay 505 operates to break the energization circuit for the motor magnet 520 and the rotary switch associated therewith advances one step. When motor magnet 520 deenergizes, it causes relay 500 to restore. Relay 500 restores to cause the transmitter 380 to cease sending the mark pulse and to again send the space pulse. The polar relay 340 and 340' connected to the receiver 360 then assumes the opposite operated position. This results in the deenergization of motor magnet 215. Motor magnet 215 deenergizes to step the wipers of the rotary switch associated therewith one step. As the rotary switch is stepped the previously described off-normal springs are operated, and relay 255 operates as a result of the closing of off-normal springs 263. The deenergization of the motor magnet 215 causes relay 310 to restore. Relay 310 restores to cause the transmitter 350 to cease sending the mark pulse and to again send the space pulse. The polar relay 385 and 385' connected to the receiver 370 then assumes the opposite operated position. This causes the motor magnet 510 to be deenergized and to advance the wiper of the rotary switch associated therewith one step. Now if no interference has been induced into the system, a circuit for relay 525 will be completed to break the holding circuits for relays 505 and 515, which in turn would again complete the energization circuit for motor magnet 520. However, at the same time that relay 525 operates, relay 540 operates to prevent any further energization of the motor magnet 520. The lower winding of relay 540 is energized over the following circuit: battery, relay 540, contacts 532, the wiper of the contact bank 553, the second contact of the contact bank 553, contacts 584, the lower winding of relay 585, contacts 583 to ground. Relay 540 partially operates to close contacts 529 only. The following circuit for the complete operation of relay 540 may then be traced as follows: battery, the upper winding of relay 540, contacts 529, pulsing springs 516, contacts 547 to ground. Relay 540 completely operates thereby closing contacts 526 and 536 and opening contacts 541 and 543. The opening of contacts 543 prevents any false operation of the motor magnet 510. The opening of contacts 541 prevents any further operation of the motor magnet 520 as the relay 525 operates to cause relays 515 and 505 to restore. The closing of contacts 536 results in the completion of an obvious circuit for the operation of relay 550. Relay 550 operates to close contacts 533 to complete a circuit for the operation of slow-to-operate relay 545. The time interval between the closing of contacts 536 and the operation of relay 545 is about one second. Contacts 522 and 524 close upon the operation of relay 545 and contacts 524 complete the following circuit for the operation of relay 375: battery, relay 375, conductor 31, conductor 37, contacts 526, contacts 524 to ground. It may be noted that at this time the relays 405, 410 and 415 do not operate to pulse relay 375, but relay 375 remains steadily operated. Contacts 332 are closed by the operation of relay 375 and transmitter 380 sends a steady mark pulse. The steady mark pulse is received by the receiver 360 and causes the polar relay 340 and 340' to assume the operated position wherein contacts 322 are closed and contacts 323 are opened. The closing of contacts 322 completes the following circuit for the operation of relay 220: battery, relay 220, contacts 257, conductor 23, contacts 318, contacts 322, contacts 316, contacts 398 to ground. Relay 220 operates to close contacts 237 to complete an obvious circuit for the operation of relay 225. Contacts 238 are also closed upon the operation of relay 220 to complete an obvious circuit for the operation of relay 230. Relay 225 operates to close contacts 242 to complete an obvious holding circuit for relays 265 and 255 before these relays restore. After a short period of time relay 230 operates to close contacts 246, 243 and 232 and to open contacts 244. The closing of contacts 246 completes the following holding circuit for relay 230: battery, relay 230, contacts 246, contacts 258, contacts 259 to ground. Closed contacts 243 complete the following circuit for the operation of the polar relay 205 and 205': battery, winding 205, second contact of the contact bank 219, the wiper of the contact bank 219, contacts 243, contacts 258, contacts 259 to ground. Polar relay 205 and 205' operates to assume the position wherein contacts 212 are opened and contacts 211 are closed. Thus lamp 204 is extinguished, and lamp 203 is illuminated over an obvious circuit to indicate at the control station that the pressure in the pump equipment at the substation has returned to normal. The relays 240, 245 and 250 will again operate as previously described to flash lamp 203, except that the circuit for the shunt about the lamp 203 is completed through contacts 232 of the operated relay 230, instead of contacts 231 of relay 235 as previously described. Returning to the point at which relay 540 was operated, relay 585 was also completely operated. Relay 585 in completely operating opens contacts 574 and 588. The opening of contacts 574 breaks the holding circuit for relay 575 which restores. The opening of contacts 588 breaks the operating circuit for relay 555, and the restoration of relay 555 partially completes a circuit for the automatic operation of the motor magnet 520. As previously described, the operation of relay 330 initiates the return to normal of the equipment as the space pulse loop between the control station and the substation is opened for a number of seconds allowing the rotary switches and relays to return to normal. The normally operated relays are then reoperated and the space pulse loop is again completed. The alarm bell 207 which operated again when the pressure was returned to normal in the pump equipment is reset by the operator by the manual operation of the reset key 206 as previously described.

The high temperature alarm in the pump equipment is operated in a manner similar to that described for the operation of the high pressure alarm. When a high temperature arises in the pump equipment, the relay 570 will operate to close contacts 563. The closing of contacts 563 completes a circuit for the energization of the lower winding of relay 560. Relay 560 comprises two windings and the energization of the lower winding results in the closing of contacts 558 and 564 only. The closing of contacts 558 connects the upper winding of relay 560 to the third contact of the contact bank 551, so that when motor magnet 520 steps the wiper of the contact bank 551 to the third contact thereof a circuit will be completed for the energization of the upper windings of both relays 535 and 560. The closing of contacts 564 completes a circuit for the operation of relay 555. Relay 555 will operate to close contacts 534 to partially complete a circuit for the energization of the motor magnet 510, and to close contacts 539 to complete a circuit for the energization of the motor magnet 520. The motor magnet 520 in energizing will close pulsing springs 517 to complete circuits for the operation of relays 500 and 506. Relay 500 will operate to close contacts 501 to cause the transmitter 380 to send a mark pulse. The mark pulse received by the receiver 360 will cause the polar relay 340 and 340' to operate to close contacts 322. The closing of contacts 322 completes a circuit for the energization of motor magnet 215. The motor magnet 215 will be energized to close pulsing springs 227 to complete a circuit for the operation of relay 310. Relay 310 will operate to close contacts 304 to cause the transmitter 350 to send a mark pulse. The mark pulse received by the reeciver 370 will cause the polar relay 385 and 385' to close contacts 331 to complete the circuit for the energization of motor magnet 510. The motor magnet 510 in energizing will complete a circuit for the operation of relay 515 which will lock up to ground at contacts 547. Relay 505 operates to open contacts 503 to cause the motor magnet 520 to deenergize. Relay 505 will also lock up to ground at contacts 547. The deenergization of motor magnet 520 will cause the circuit for relay 500 to open, and relay 500 will restore to open contacts 501 to cause the transmitter 380 to cease sending the mark pulse. This will cause the polar relay 340 and 340' to operate to close contacts 323 and to open contacts 322. The opening of contacts 322 will cause the motor magnet 215 to deenergize. As the motor magnet 215 deenergizes, springs 227 will open to break the circuit for the relay 310 which will restore. Contacts 304 will then open to cause the transmitter 350 to cease sending a mark pulse. This will cause the polar relay 385 and 385' to operate to open contacts 331 to cause motor magnet 510 to be deenergized. As the three motor magnets 510, 520 and 215 are deenergized, they step the wipers of their associated contact banks one step. This results in the completion of a circuit for the operation of relay 525 through the contact banks 513 and 514. Relay 525 operates to open contacts 521 to break the holding circuits for relays 505 and 515. As these relays restore, the circuit for the energization of the motor magnet 520 is again completed, and the cycle is repeated until the wipers are stepped to the third contact of the various contact banks at which time the upper windings of relays 535 and 560 will become energized. Relay 535 will operate to open contacts 546 to prevent any further energization of the motor magnet 520, thus stopping the stepping cycle. Contacts 537 of relay 535 will also close to complete a circuit for the operation of relay 550, which will in turn complete a circuit for the operation of relay 545. This results in the completion of a circuit for relay 415. Relays 415, 410 and 405 are then operated in turn to pulse contacts 424. This causes a pulsing of the relay 375, which pulses contacts 332. The transmitter 380 then sends a series of mark pulses which are received by the receiver 360. The polar relay 340 and 340' follows the pulses. Relay 255 which operated as a result of the stepping of the rotary switch comprising the motor magnet 215, has closed contacts 257 so that the mark pulses received by the receiver 360 cause relay 220 to pulse. Relay 220 causes the operation of relay 225 and relay 235. The operation of relay 235 causes the completion of the following circuit: battery, winding 200', the third contact of the contact bank 218, the wiper of the contact bank 218, contacts 228, contacts 258, contacts 259 to ground. Polar relay 200 and 200' then operates to assume the opposite operated position, wherein contacts 208 are opened to extinguish lamp 201 and contacts 209 are closed to illuminate lamp 202. As previously described, the operation of relay 235 also completes circuits for the operation of the alarm bell 207. Also as previously described, the three relays 240, 245 and 250 operate in cycles to pulse contacts 248. This causes the lamp 202 to be flashed on and off by means of a shunt circuit through the third contact of the contact bank 221. Returning to the point at which the upper winding of relay 560 was energized, relay 560 was completely operated to operate the remainder of the contacts associated therewith. Thus contacts 566 were opened to cause relay 555 to restore. The operation of relay 330 initiates the restoration of the rotary switches and circuits as previously described. However similarly to the description of the high pressure alarm, the relays 570 and 560 will remain energized and the lamp 202 will be illuminated as long as a high temperature exists within the pump equipment.

The high temperature alarm is restored in a manner similar to that described for the restoration of the high pressure alarm and therefore will not be described in detail. When the high temperature in the pump equipment has been rectified, the relay 570 will restore to open contacts 563. The opening of these contacts removes the shunt about the upper windings of relay 565, and relay 565 will partially operate to close contacts 568 and 569. The closing of contacts 568 connects the lower winding of relay 565 to the third contact of the contact bank 553 so that when the wiper of that contact bank is stepped to the third contact, a circuit will be completed for the energization of the lower windings of relays 540 and 565 in series. The closing of contacts 569 completes a circuit for the operation of relay 555. As described previously, the operation of relay 555 initiates the operation of the three rotary switches to step them to the third bank contact of the various contact banks. Then if no interference has been induced into the system to cause a non-synchronized stepping of the three rotary switches, circuits are prepared for transmitting a signal to indicate that the high temperature alarm has restored. The first circuit comprises the relay 540 which operates to cause relay 375 to operate to cause the transmitter 380 to send a steady mark pulse. The steady mark pulse is received by the receiver 360 and causes the operation of relays 220, 225 and 230. This results in the establishment of a circuit for the winding 200 of the polar relay 200 and 200', which operates to open contacts 209 and to close contacts 208. Then lamp 201 is illuminated and lamp 202 is extinguished to indicate that the high temperature alarm has restored. Also as previously described, the alarm bell 207 is sounded to further indicate at the control station that the high temperature in the pump equipment has been rectified. Meanwhile as previously described, relay 330 operates to initiate the restoration of the rotary switches and circuits to normal.

If the high temperature alarm and the high pressure alarm should operate at approximately the same instant, it can be seen from the above description that the first alarm will be registered, that the equipment will restore and that the second alarm will be registered. It can also be seen from the foregoing description that this system can very easily be expanded to include a large number of control facilities and a large number of alarm functions.

If the power at the substation should fail or if the connection between the two stations should break due to a storm or accumulation of sleet on the telephone lines, the polar relay 340 and 340' will assume the neutral position wherein contacts 322 and 323 are open. This will break the operating circuit for relay 265 which will restore after a short interval of time. As relay 265 restores contacts 261 will open to cause relay 260 to restore. As relay 260 restores the operating circuit for relay 110 will be broken at contacts 268. Relay 110 will restore to close contacts 121 and to open contacts 119. The opening of contacts 119 will break the circuit for lamp 123 and lamp 123 will be extinguished. The closing of contacts 121 will again complete the previously described circuit for the operation of relay 120. After a short interval of time relay 120 will operate to close contacts 122 and 117. The closing of contacts 122 completes the following circuit for the illumination of lamp 124: battery, lamp 124, contacts 122, contacts 121, conductor 43, conductor 44, contacts 301 to ground. The closing of contacts 117 completes the following circuit for the operation of relay 210: battery, relay 210, conductor 9, contacts 117, contacts 118, conductor 43, conductor 44, contacts 301 to ground. Relay 210 will operate to close contacts 214 and 216. The closing of contacts 216 completes the circuit for the operation of the alarm bell 207. The closure of contacts 214 completes the previously described lock up circuit for relay 210. Thus the alarm lamp 124 will be illuminated and the alarm bell 207 will be sounded to indicate at the control station that either the power at the substation has failed, or that the lines between the stations are open. When the power failure or the broken line has been corrected, the space pulse will again be transmitted and received and relay 265 will again be operated. Relay 265 will close contacts 261 to cause relay 260 to operate. Relay 265 in operating will close contacts 268 to again complete the circuit for the operation of relay 110. Relay 110 will operate to break the operating circuit for relay 120 and the lamp 124, and will complete the circuit for the illumination of lamp 123 to indicate a normal condition of the equipment.

Having described my invention in detail what I consider to be new and desire to be protected by Letters Patent is:

1. A remote control system comprising a control station and a remote station having a plurality of devices thereat, means for establishing a selecting channel between the stations including a carrier current of one frequency and a checking channel between said stations including a carrier current of another frequency, means at said control station for modulating said selecting channel carriers, means at said remote station for modulating said checking channel carrier, a circuit, control means selectively operated at said control station for completing said circuit and thereby initiating a selecting operation, means operated responsive to the completion of said circuit for causing said first modulating means to modulate said selecting channel carrier, means at said remote station operated responsive to the receipt thereat of said modulated selecting channel carrier for causing said second modulating means to modulate said checking channel carrier, means at said control station operated responsive to the receipt thereat of said checking channel carrier for causing said selecting channel carrier to be unmodulated, said means at said remote station operated responsive to the receipt of said unmodulated carrier causing said checking channel carrier to be unmodulated, means for repeating the modulating and unmodulating operations, means including said means at said remote station operated responsive to the receipt of a predetermined number of said modulations or unmodulations of said selecting channel carrier for selecting the desired device, means for stopping said modulations and unmodulations when the proper device has been selected, means including said means at said control station operated responsive to the receipt of a predetermined number of said modulations and unmodulations of said checking channel carrier for indicating the selection of the proper device.

2. A remote control system having a control station and a substation with a plurality of devices thereat, means for establishing a selecting channel between said stations including a carrier current of one frequency and a checking channel between said stations including a carrier current of another frequency, means for modulating said selecting channel carrier, means for modulating said checking channel carrier, three rotary switches, the first and second of said rotary switches at said control station, the third of said rotary switches at said remote station, a circuit, control means selectively operated at said control station for completing said circuit and thereby initiating the selection of a desired device at the remote station, means operated responsive to the completion of said circuit for causing said first modulating means to modulate the selecting channel carrier, means at said remote station operated responsive to the receipt of said modulated carrier for causing said second modulating means to modulate said checking channel carrier, means at the control station operated responsive to the receipt of said last mention modulated carrier for causing the demodulation of said selecting channel carrier, said means at said remote station operated responsive to the receipt of said last mentioned demodulated carrier for causing the demodulation of said checking channel carrier, means for repeating said modulations and demodulations of both carriers, said means at said remote station causing said third rotary switch to step in response to each demodulation of said selecting channel carrier, to thereby select a particular device when said third rotary switch steps a predetermined number of steps, said means at said control station causing said second rotary switch to step in response to each demodulation of said checking channel carrier, means operated in response to the stepping of the second rotary switch for causing the first rotary switch to step, means including the first rotary switch for stopping the modulation of the carriers when the proper device has been selected, and means operated responsive to a predetermined number of steps of the first and second rotary switches for indicating the selection of the proper device.

3. In a remote control system according to claim 2, means selectively operated at the control station for causing said first modulating means to cause a code of modulations of said selecting channel carrier to be transmitted, means including said means at the remote station operated responsive to the receipt thereof of said code of modulations for controlling a corresponding function of said selected device at said remote station.

4. In a remote control system according to claim 3, means at said remote station operated responsive to the control of certain functions of the selected device for causing a code of modulations of said checking channel carrier to be transmitted, means including said means at the control station operated responsive to the receipt thereat of said code of modulations of the checking channel carrier for indicating the proper control of certain functions of the selected device at said remote station.

5. In a remote control system a near and a remote station, a pair of channels linking said stations each including a carrier current of a particular frequency, means for modulating said carrier currents, control means at the near station for performing a circuit change thereat thereby initiating a selecting operation, means responsive to said circuit change for causing the frequency of the carrier of one channel to be modulated by one of said modulating means, means at the remote station operated in response to the receipt of said modulated frequency to perform a partial selection step and to in turn cause a modulation of the frequency of the carrier current in the other channel by said other modulating means, means in the near station operated responsive to the receipt of said last mentioned modulated carrier to cause the frequency of the carrier current in said one channel to be unmodulated, said means at the remote station operated responsive to the receipt of said unmodulated frequency for causing the completion of said selection step and also for causing the frequency of the carrier current in the other channel to be unmodulated, means for repeating said modulation and unmodulation operations until the selecting operation of a predetermined number of selection steps in the remote station is completed, and means in the near station for stopping the modulation of the carrier when the selecting operation is completed.

6. A remote control system having a control station with a plurality of indicators thereat and a remote station with a plurality of devices thereat, means for establishing an alarm channel between said stations including a carrier current of one frequency and a checking channel between said stations with a carrier current of another frequency, means for modulating said alarm channel carriers, means for modulating said checking channel carrier, a circuit, control means at said remote station operated responsive to a faulty operating condition of any one of said devices for completing said circuit and initiating the selection of a proper alarm indicator, means operated responsive to the completion of said circuit for causing said first modulating means to modulate said alarm channel carrier, means at said control station operated responsive to the receipt of said modulated carrier for causing said second modulating means to modulate said checking channel carrier, means at said remote station operated responsive to the receipt of said last mentioned modulation for causing said alarm channel carrier to be demodulated, means at the remote station for registering said demodulations of said alarm channel carrier, said means at the control station operated responsive to the receipt of said demodulated carrier for causing said checking channel carrier to be demodulated, means for repeating said modulation and demodulation operations, means including said means at the control station operated responsive to the receipt thereat of a predetermined number of said alarm channel demodulations for selecting the proper alarm indicator, means at said remote station for registering the receipt thereat of said demodulations of said checking channel, means for stopping the modulations when the proper indicator has been selected, a checking circuit, means for completing said checking circuit only when both said registering means register the same number of demodulations, and means operated responsive to the completion of said checking circuit for causing said selected alarm indicator at said control station to operate.

7. A remote control system having a control station with a plurality of alarm indicators thereat, and a remote station with a plurality of devices thereat, means for establishing an alarm channel including a carrier current of one frequency and a checking channel having a carrier current of another frequency, means for modulating said alarm channel carrier, means for modulating said checking channel carrier, three rotary switches, the first and second of said rotary switches at said remote station, the third of said rotary switches at said control station, a circuit, control means at said remote station operated responsive to the faulty operating condition of any one of said devices for completing said circuit, means operated responsive to the completion of said circuit to cause said alarm channel carrier to be modulated by the first of said modulating means, means at said control station operated responsive to the receipt of said modulated alarm channel carrier for causing said checking channel carrier to be modulated by the second of said modulating means, means at the remote station operated responsive to the receipt of said last mentioned modulated carrier for causing said alarm channel carrier to be unmodulated, said means at said control station operated responsive to the receipt of said unmodulated alarm channel carrier, causing said checking channel carrier to be unmodulated, means for repeating said modulations and unmodulations operations, said means at said remote station causing said first and third rotary switches to step in response to the receipt of each unmodulation of said alarm channel carrier, means for stopping said modulations when said third rotary switch has stepped a predetermined number of steps selecting the proper alarm indicator, said means at said remote station causing said second rotary switch to step in response to the receipt of each unmodulation of said checking channel carrier, means at said remote station for causing the first of said modulating means to cause a code of modulations of said alarm channel carrier to be transmitted when the first and second rotary switches have been stepped an equal number of steps, means at said sontrol station operated responsive to the receipt of said code of modulations for causing the operation of said selected alarm indicator.

8. A remote control system having a near station and a remote station with a plurality of devices thereat, means for establishing a channel between said stations including a carrier current of one frequency and a second channel between said stations with a carrier current of another frequency, means for modulating said one channel carrier, means for modulating said second channel carrier, a circuit, means at the near station operated in response to a change in said circuit for causing said first modulating means to modulate said one channel carrier, means at said remote station operated responsive to the receipt thereat of said last mentioned modulated carrier for performing a partial selection step and in turn causing said second modulating means to modulate said second channel carrier, means at said near station operated responsive to the receipt thereat of said last mentioned modulated carrier for causing said first channel carrier to be restored to its unmodulated condition, registering means at said near station for registering the restoration of said first channel carrier, said means at said remote station operating responsive to the receipt thereof of said unmodulated one channel carrier to complete said selection step and in turn causing said second channel carrier to be restored to its unmodulated condition, means for continuing the modulation and restoration operations until a predetermined number of selection steps have been completed and the proper device at the remote station has been selected, means at said near station for registering the receipt thereat of said restored second channel carrier, a checking circuit, and means for completing said checking circuit only when both of said registering means have registered the same number of restorations.

9. In a remote control system having a near and a remote station, transmitting means and receiving means at each of said stations, means for causing the transmission of an electromagnetic wave current of one frequency to be transmitted from said near station and an electromagnetic wave of a second frequency from the remote station, control means at said near station operated to perform a circuit change thereat thereby initiating a selecting operation, means operated responsive to said circuit change for causing said near station transmitting means to transmit an electromagnetic wave current of a third frequency, means at said remote station operated responsive to the receipt of said third frequency wave current for causing said remote station transmitting means to transmit an electromagnetic wave current of a fourth frequency, means at said near station operated responsive to the receipt of said fourth frequency wave current for restoring the transmission therefrom of said electromagnetic wave current of said first frequency, said means at said remote station operated responsive to the receipt of said last mentioned wave current restoring the transmission therefrom of said electromagnetic current wave of said second frequency, means for causing the repetition of the described cycle of transmission, a selecting device at said remote station prepared to perform a selection step responsive to the receipt of said current waves of said third frequency and completing said selection step responsive to the restoration of said electromagnetic wave current of said first frequency, and means at said near station for stopping the transmission of said third frequency after a predetermined number of selecting steps.

10. A remote control system according to claim 9, said means at said remote station comprising a three position polar relay, said relay assuming a neutral position when no frequencies are received and assuming one of two different operating positions corresponding to the receipt of either said first or said third frequency, and said means at said near station comprising another three position polar relay, said other relay assuming a neutral position when no frequencies are received and assuming one of two different operating positions corresponding to the receipt of either said second or said fourth frequency.

References Cited in the file of this patent

UNITED STATES PATENTS

| 1,803,614 | Hershey | May 5, 1931 |
| 1,932,623 | Hershey | Oct. 31, 1933 |
| 2,049,621 | Remington | Aug. 4, 1936 |
| 2,049,622 | Richardson | Aug. 4, 1936 |
| 2,141,551 | Phinney | Dec. 27, 1938 |
| 2,176,750 | Simpson | Oct. 17, 1939 |
| 2,205,894 | White | June 25, 1940 |
| 2,368,826 | Hailes | Feb. 6, 1945 |

FOREIGN PATENTS

| 282,858 | Great Britain | Dec. 28, 1927 |